(12) United States Patent
Ylänen et al.

(10) Patent No.: US 7,668,565 B2
(45) Date of Patent: Feb. 23, 2010

(54) MULTIRADIO PRIORITY CONTROL BASED ON MODEM BUFFER LOAD

(75) Inventors: Jussi Ylänen, Lempäälä (FI); Ville Pernu, Tampere (FI)

(73) Assignee: Nokia Corporation, Espoo (FI)

( * ) Notice: Subject to any disclaimer, the term of this patent is extended or adjusted under 35 U.S.C. 154(b) by 605 days.

(21) Appl. No.: 11/557,215

(22) Filed: Nov. 7, 2006

(65) Prior Publication Data

US 2008/0108361 A1 May 8, 2008

(51) Int. Cl.
*H04M 1/00* (2006.01)
(52) U.S. Cl. .................... 455/553.1; 370/463
(58) Field of Classification Search .......... None
See application file for complete search history.

(56) References Cited

U.S. PATENT DOCUMENTS

| 5,448,701 A | 9/1995 | Metz, Jr. et al. |
| 6,067,408 A | 5/2000 | Runaldue et al. |
| 2004/0027990 A1 | 2/2004 | Lee et al. |
| 2004/0071086 A1* | 4/2004 | Haumont et al. ............ 370/230 |
| 2005/0170776 A1 | 8/2005 | Siorpaes |
| 2006/0221936 A1* | 10/2006 | Rauchwerk ................. 370/352 |
| 2006/0285557 A1* | 12/2006 | Anderton et al. ........... 370/503 |
| 2008/0109865 A1* | 5/2008 | Su et al. ..................... 725/116 |
| 2008/0244072 A1* | 10/2008 | Broberg et al. .............. 709/226 |

FOREIGN PATENT DOCUMENTS

EP        1703675 A1     9/2006

* cited by examiner

*Primary Examiner*—Ajit Patel
(74) *Attorney, Agent, or Firm*—Locke Lord Bissell & Liddell

(57) ABSTRACT

A system for controlling communications in a multiradio wireless communication device (WCD) by monitoring a backlog of messages waiting to be wirelessly transmitted through one or more radio modems as compared to a predetermined threshold. If the amount of pending messages meets and/or exceeds the predetermined threshold then a potentially problematic situation may exist, and actions may be taken to alleviate the large message backlog. Actions may include, for example, temporarily reallocating communication time for one or all of the radio modems. This time may be reallocated to radio modems experiencing potential message queue overflows in order to reduced the backlog of messages and avoid a potential communication failure.

34 Claims, 22 Drawing Sheets

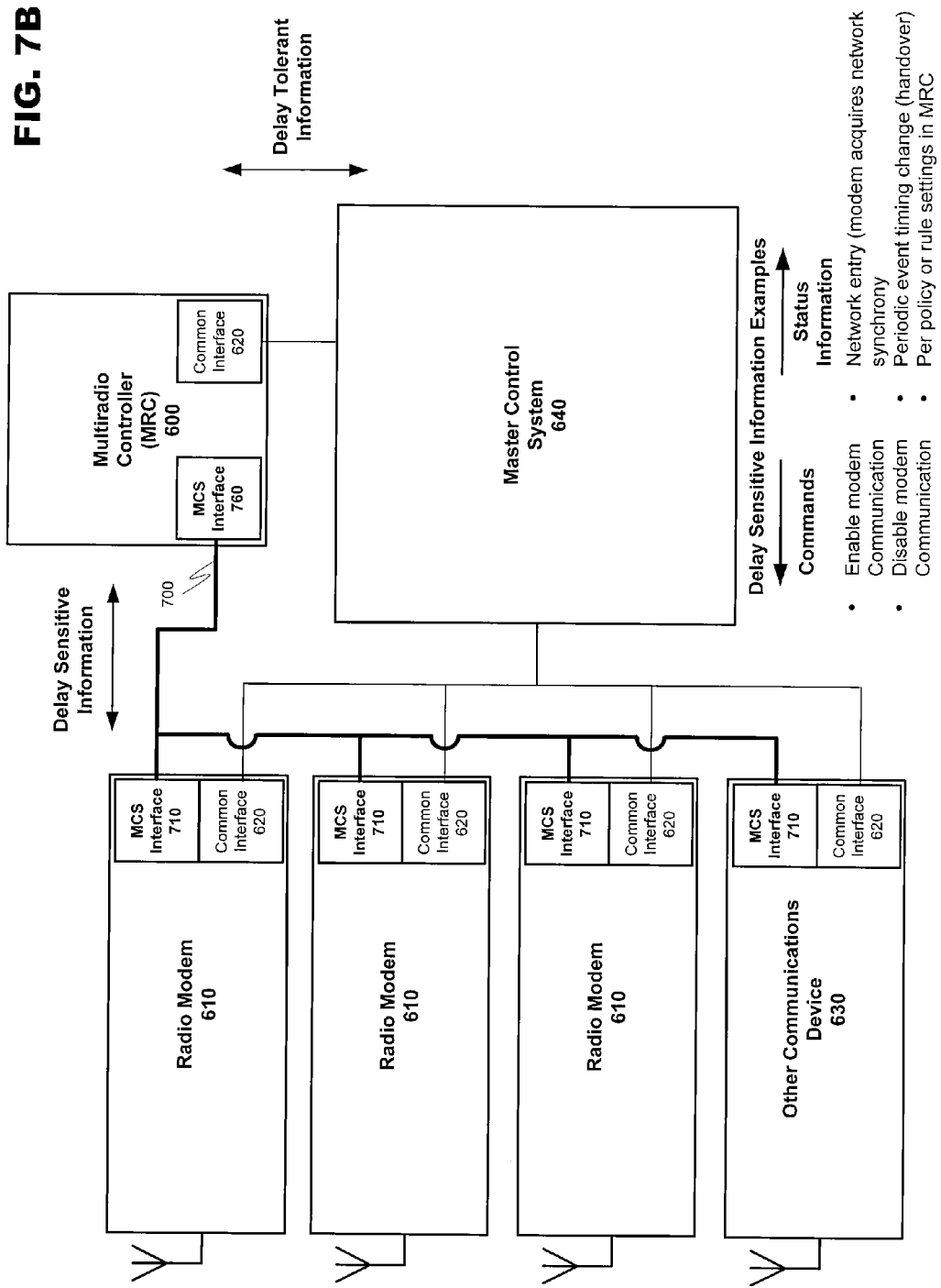

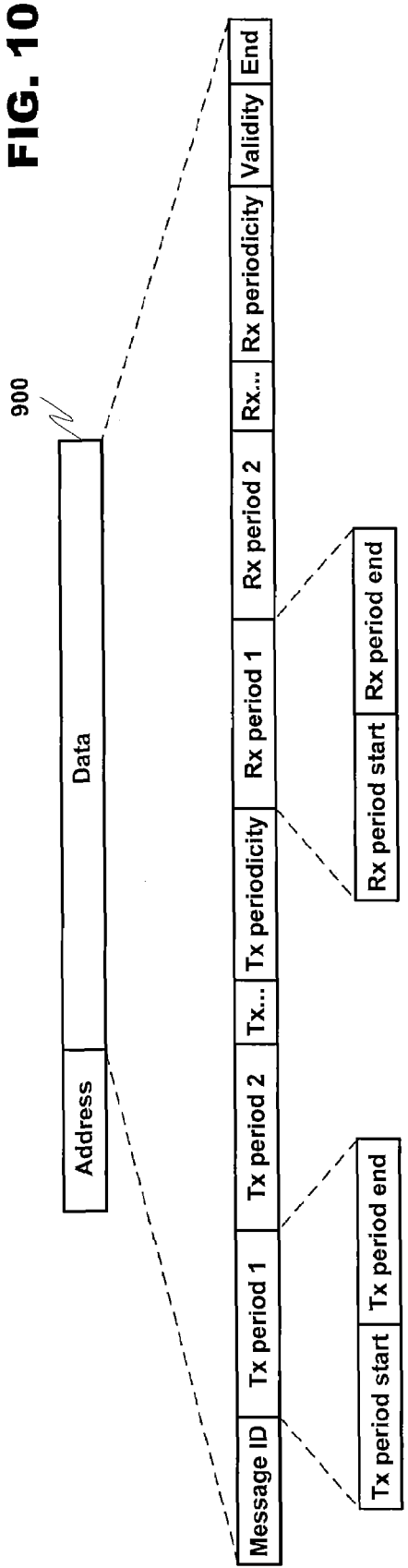

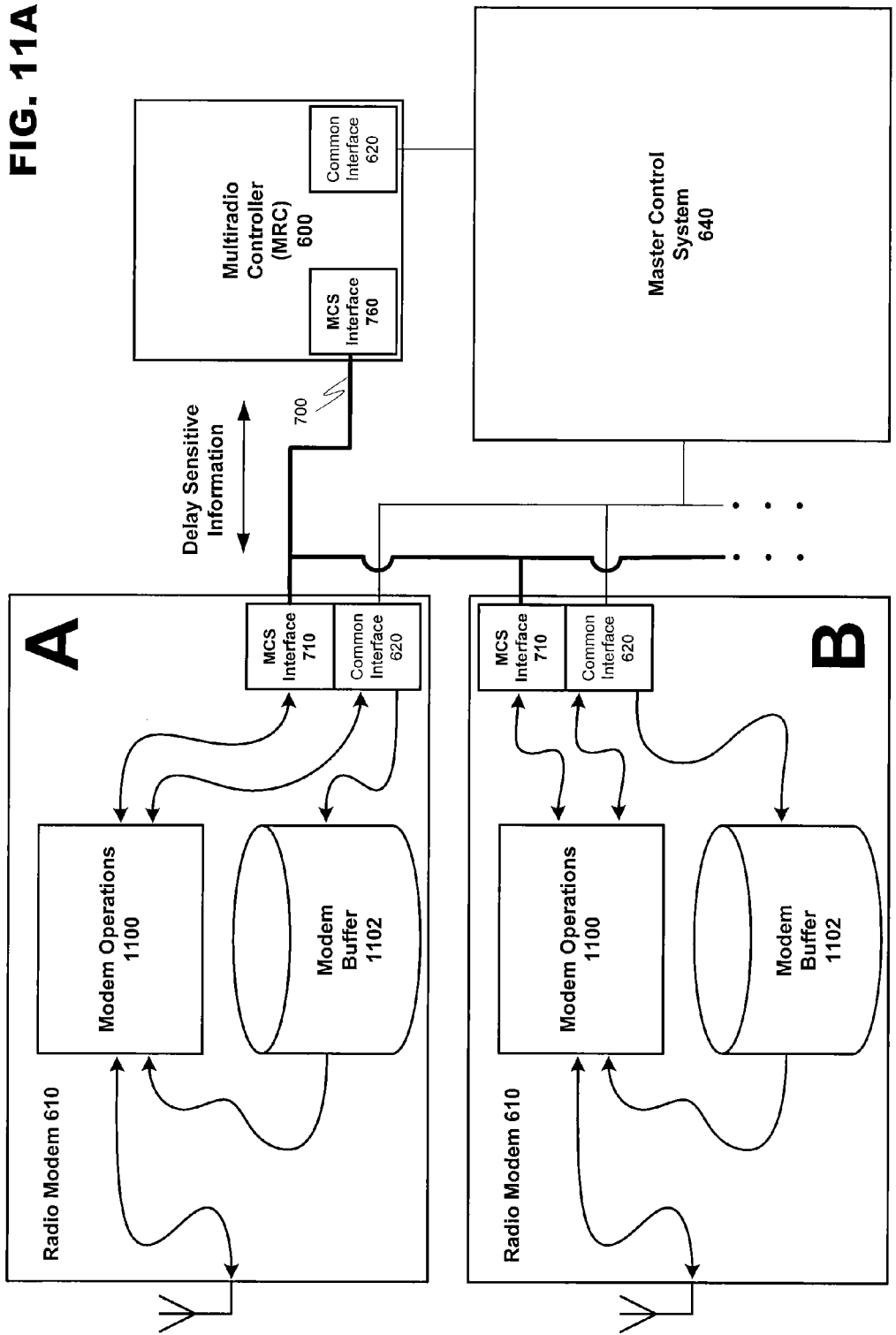

MULTIRADIO PRIORITY CONTROL BASED ON MODEM BUFFER LOAD

BACKGROUND OF INVENTION

1. Field of Invention

The present invention relates to a system for managing multiple radio modems integrated within a wireless communication device, and more specifically, to a multiradio control system enabled to create an operational schedule for a plurality of radio modems, wherein communication time previously reserved for certain priority radio modems may be reallocated to other radio modems that may be experiencing a large backlog of messages to be transmitted.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Near Field communication (NFC) technologies include machine-readable mediums such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and NFC resources also often include multiple mediums for each category. This may allow a communication device to flexibly adjust to its surroundings, for example, communicating both with a WLAN access point and a Bluetooth™ communication accessory, possibly at the same time.

Given the large array communication features that may be compiled into a single device, it is foreseeable that a user will need to employ a WCD to its full potential when replacing other productivity related devices. For example, a user may use a high powered WCD to replace traditional tools such as individual phones, facsimile machines, computers, storage media, etc. which tend to be more cumbersome to both integrate and transport. In at least one use scenario, a WCD may be communicating simultaneously over numerous different wireless mediums. A user may utilize multiple peripheral Bluetooth™ devices (e.g., a headset and a keyboard) while having a voice conversation over GSM and interacting with a WLAN access point in order to access the Internet. Problems may occur when these concurrent transactions cause interference with each other. Even if a communication medium does not have an identical operating frequency as another medium, a radio modem may cause extraneous interference to another medium. Further, it is possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

Current strategies for regulating air time between two or more radio modems may, in some instances, result in other communication problems. For example, a prioritization of radio modems, or wireless mediums operating on various radio modems, may be used to create an operational schedule for active radio modems in a WCD. In one example, a large percentage of the available communication time may be reserved for a particular wireless medium, while other wireless mediums are forced to operate in spaces of time unused by the more dominant medium. In another scenario, time may be shared on a percentage basis for each radio modem or wireless medium. In still a third example, an upper-level application utilizing a particular wireless communication medium may unexpectedly request that a large amount of information be immediately transmitted. In any of these situations, it is foreseeable that a radio modem may become somewhat overwhelmed as a result of having more messages waiting for transmission than are currently able to be sent. This queue of pending messages may build to a point where communication performance suffers, or even totally fails for a modem/medium.

What is therefore needed is a management system for regulating radio modems utilizing possibly conflicting wireless communication mediums that further includes the ability to identify potentially problematic situations in radio modems. For example, a management strategy may include monitoring message transmission buffers or queues in radio modems and an alerting function if the amount of pending messages exceeds a predetermined threshold. This buffer level information may be used, for example, to temporarily alter the operation of a WCD in order to alleviate the large backlog of messages for the problematic radio modems/mediums.

SUMMARY OF INVENTION

The present invention includes at least a method, device, controller, radio modem and computer program for managing the operation of a plurality of radio modems integrated within the same WCD. In at least one embodiment of the present invention, a control strategy is employed to manage the operations of a plurality of radio modems and/or wireless mediums. In some cases, a radio modem may receive more message requests than it is able to transmit. As a result, a potential queued message overflow may begin to accumulate in the radio modem buffer.

The present invention may, in at least one example, monitor the backlog of messages in radio modems in order to determine if a predetermined threshold is exceeded. If the amount of pending messages exceeds the predetermined threshold, then actions may be taken in order to alleviate the message backlog in these radio modems. Actions may include, for example, temporarily reallocating reserved communication time away from previously scheduled radio modems in the WCD. The time may then be reallocated to potentially problematic modems in order to reduced the message backlog and avoid a potential communication failure.

Information related to potential communication buffer overflows in radio modems may be provided as delay-sensitive information over, for example, a dedicated communication interface, or alternatively as delay-tolerant information through the main communication interface of the WCD. The information may be used by controllers within the WCD to temporarily alter the operational schedule for any or all radio modems in order to alleviate a potential message queue overflow and better balance communications in the device.

DESCRIPTION OF DRAWINGS

The invention will be further understood from the following detailed description of a preferred embodiment, taken in conjunction with appended drawings, in which:

FIG. 7B discloses a more detailed structural diagram of FIG. 7A including the multiradio control system and the radio modems.

FIG. 10 discloses an exemplary information packet usable with at least one embodiment of the present invention.

FIG. 11A discloses an example of two radio modems including at least control and buffer elements in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
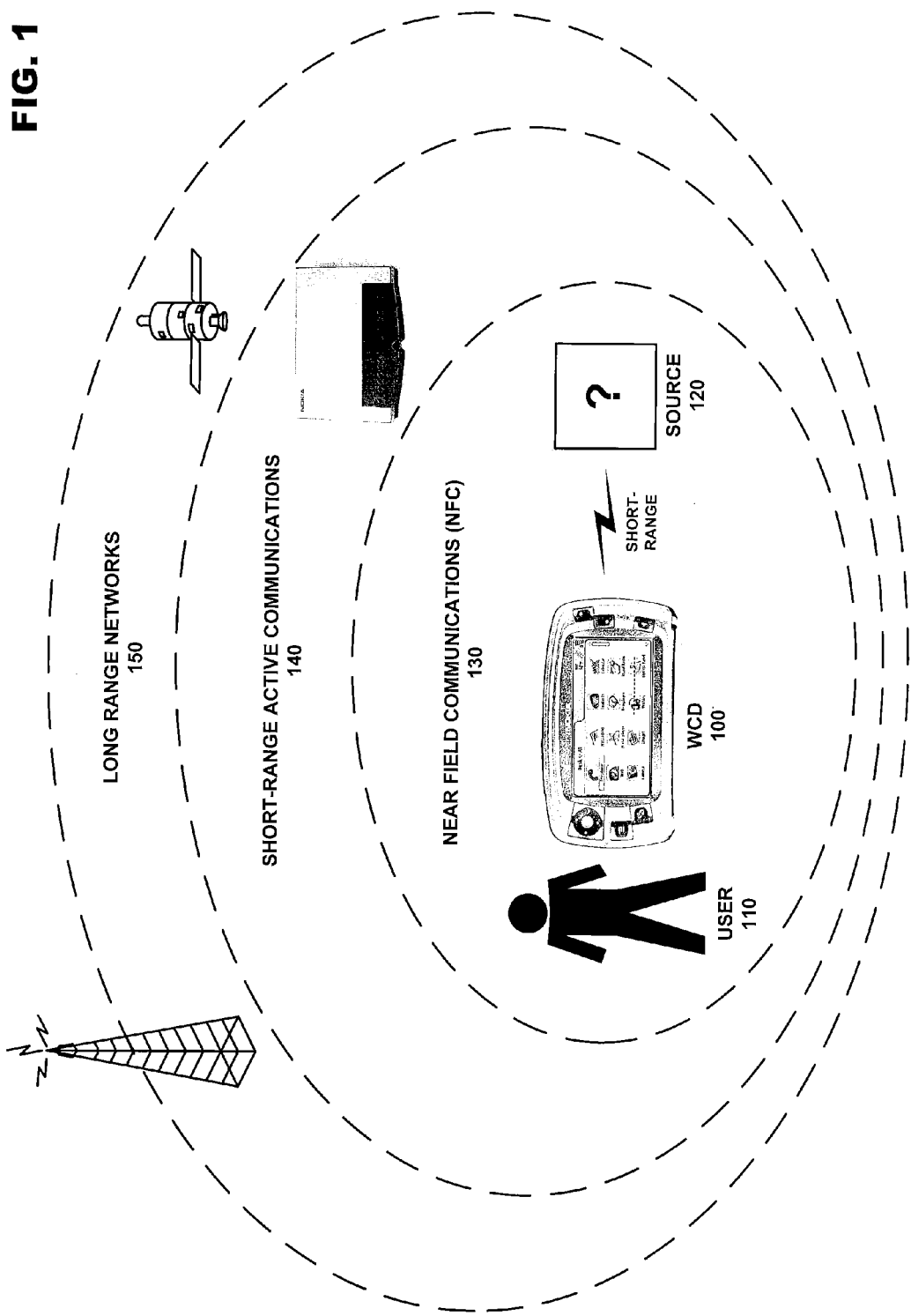
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communication (NFC) 130 includes various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
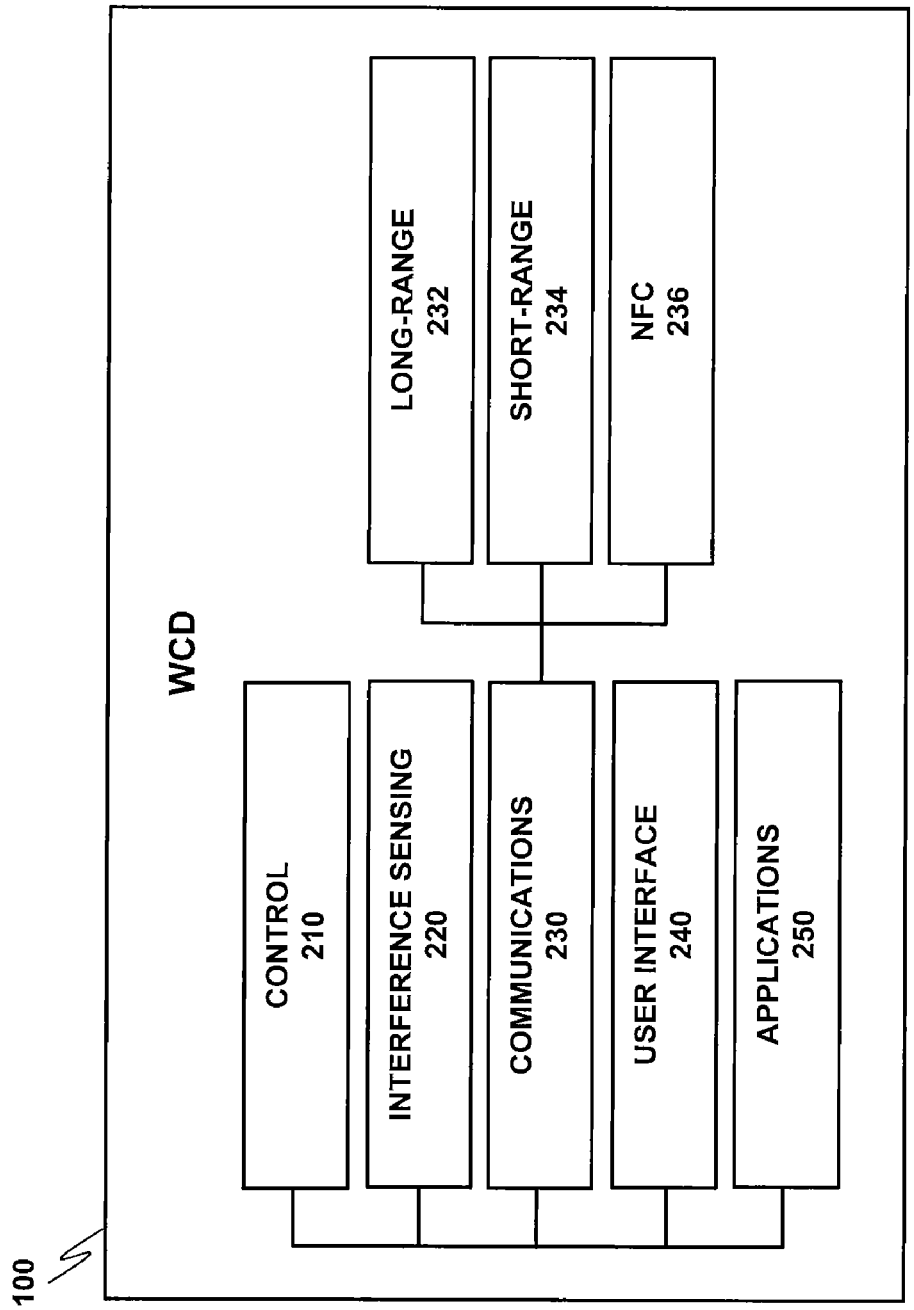
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and NFC module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
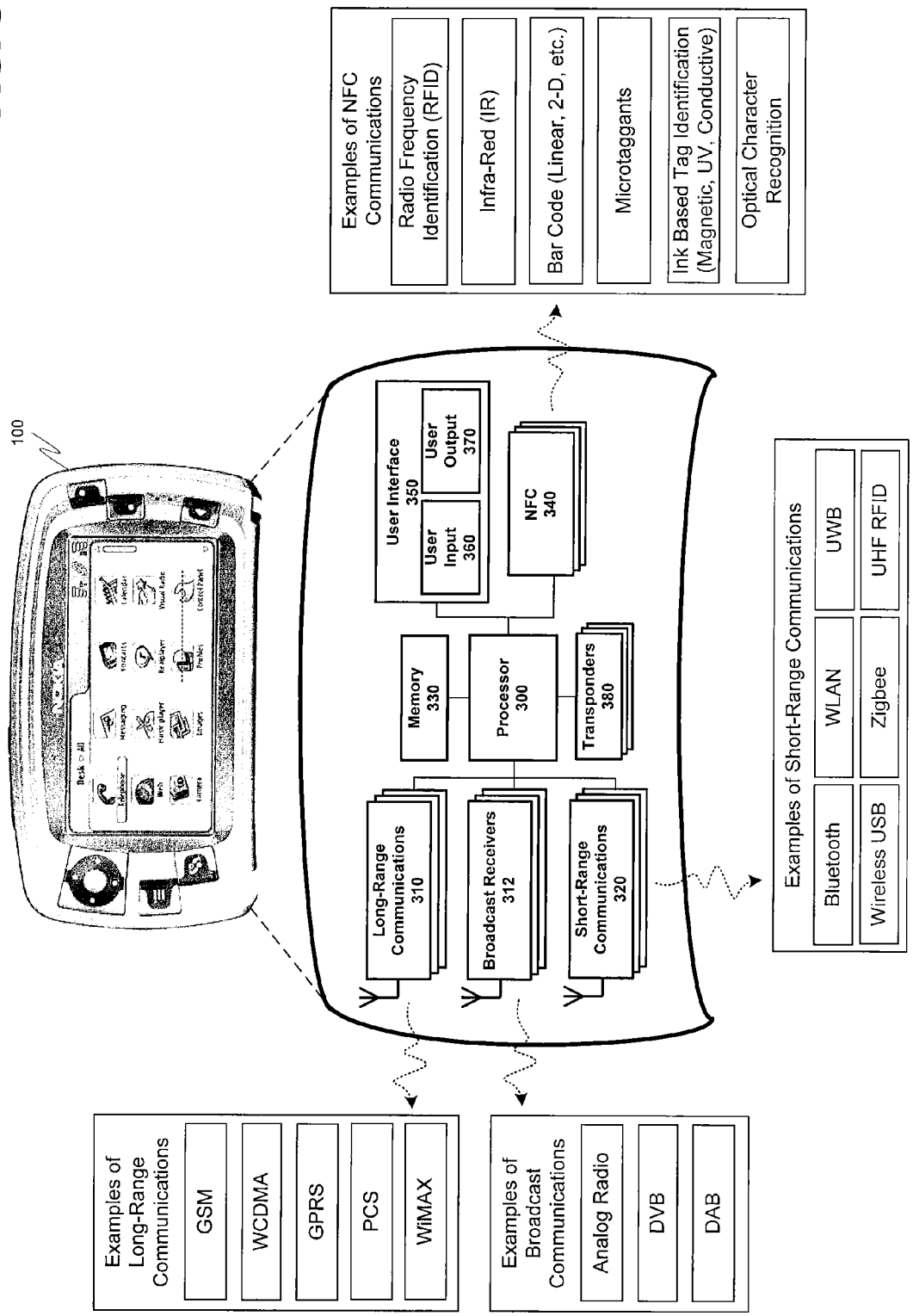
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

NFC 340, also depicted in FIG. 3, may provide functionality related to the short-range scanning of machine-readable data. For example, processor 300 may control components in NFC 340 to generate RF signals for activating an RFID transponder, and may in turn control the reception of signals from an RFID transponder. Other short-range scanning methods for reading machine-readable data that may be supported by the NFC 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for the NFC 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. In addition, a scanner may be mounted (e.g., as previously discussed above with regard to examples of NFC 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, NFC 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered.

Figure 4:
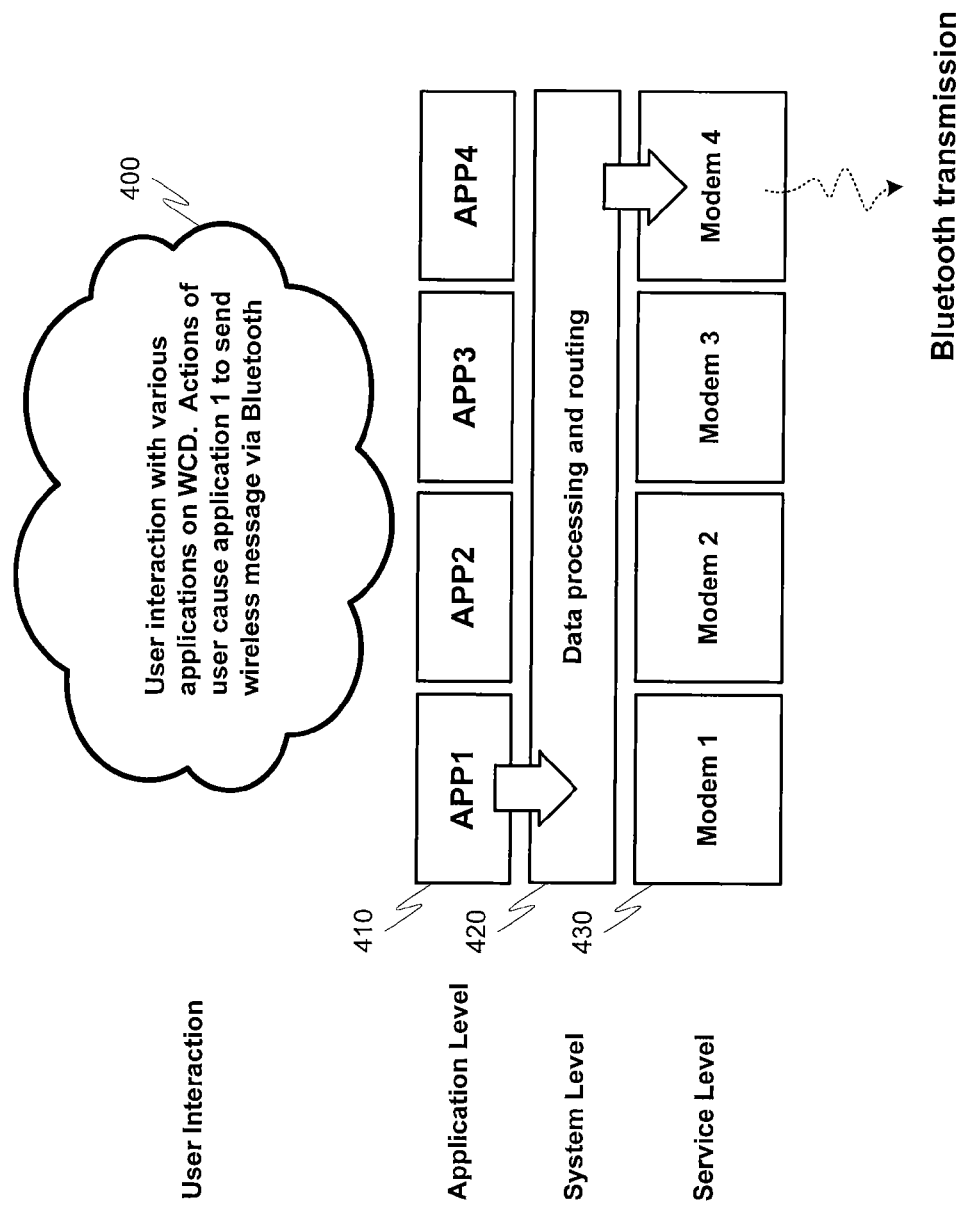
FIG. 4 discloses an exemplary operational description of a wireless communication device utilizing a wireless communication medium in accordance with at least one embodiment of the present invention.

FIG. 4 discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

Figure 5:
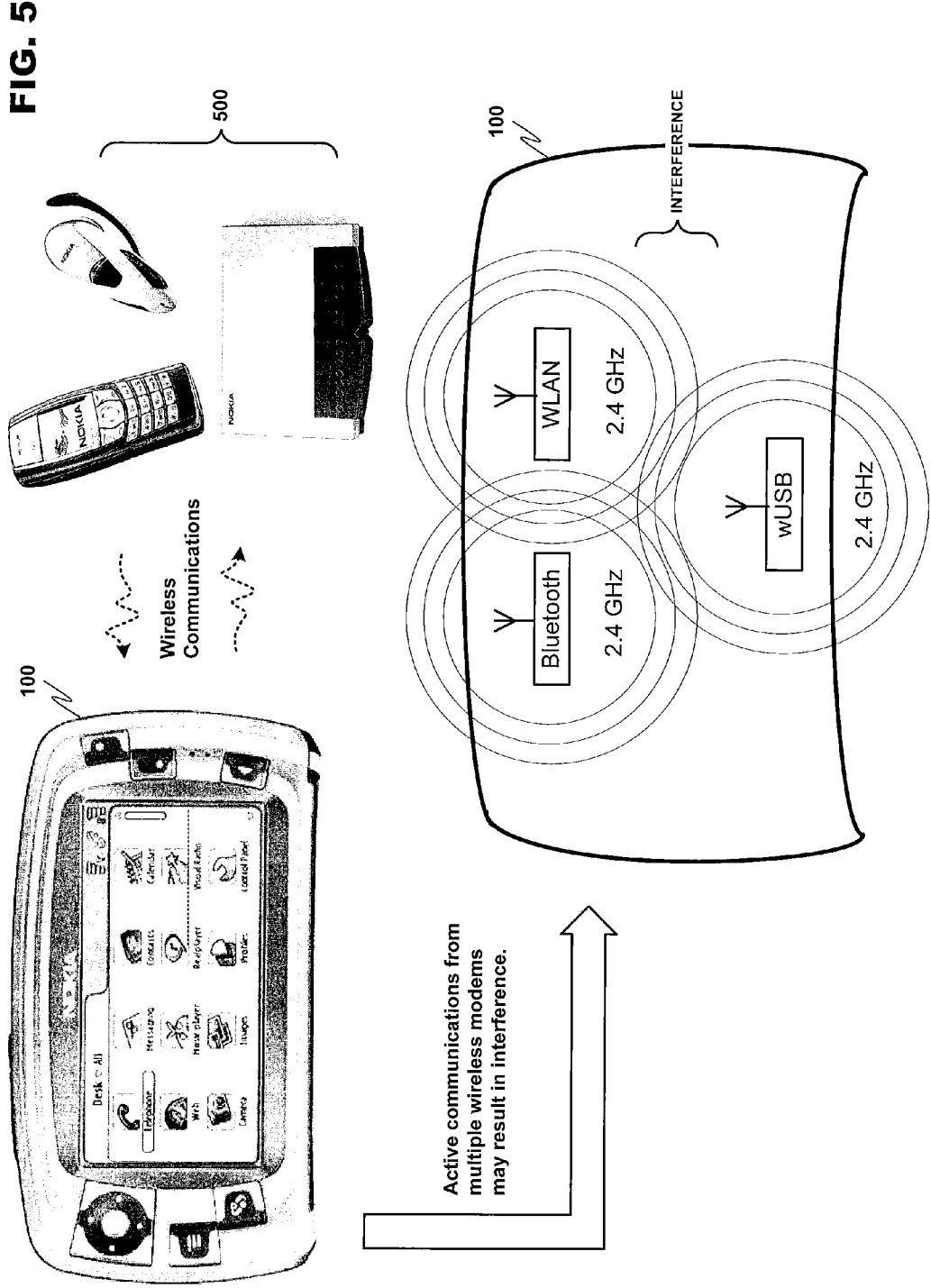
FIG. 5 discloses an operational example wherein interference occurs when utilizing multiple radio modems simultaneously within the same wireless communication device.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communication performance will at least be reduced, if the signal is not lost completely.

The present invention, in at least one embodiment, seeks to manage problematic situations where possibly conflicting communications may be occurring simultaneously so that interference is minimized or totally avoided, and as a result, speed and quality are maximized. IV. A wireless communication device including a multiradio controller.

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100.

Figure 6A:
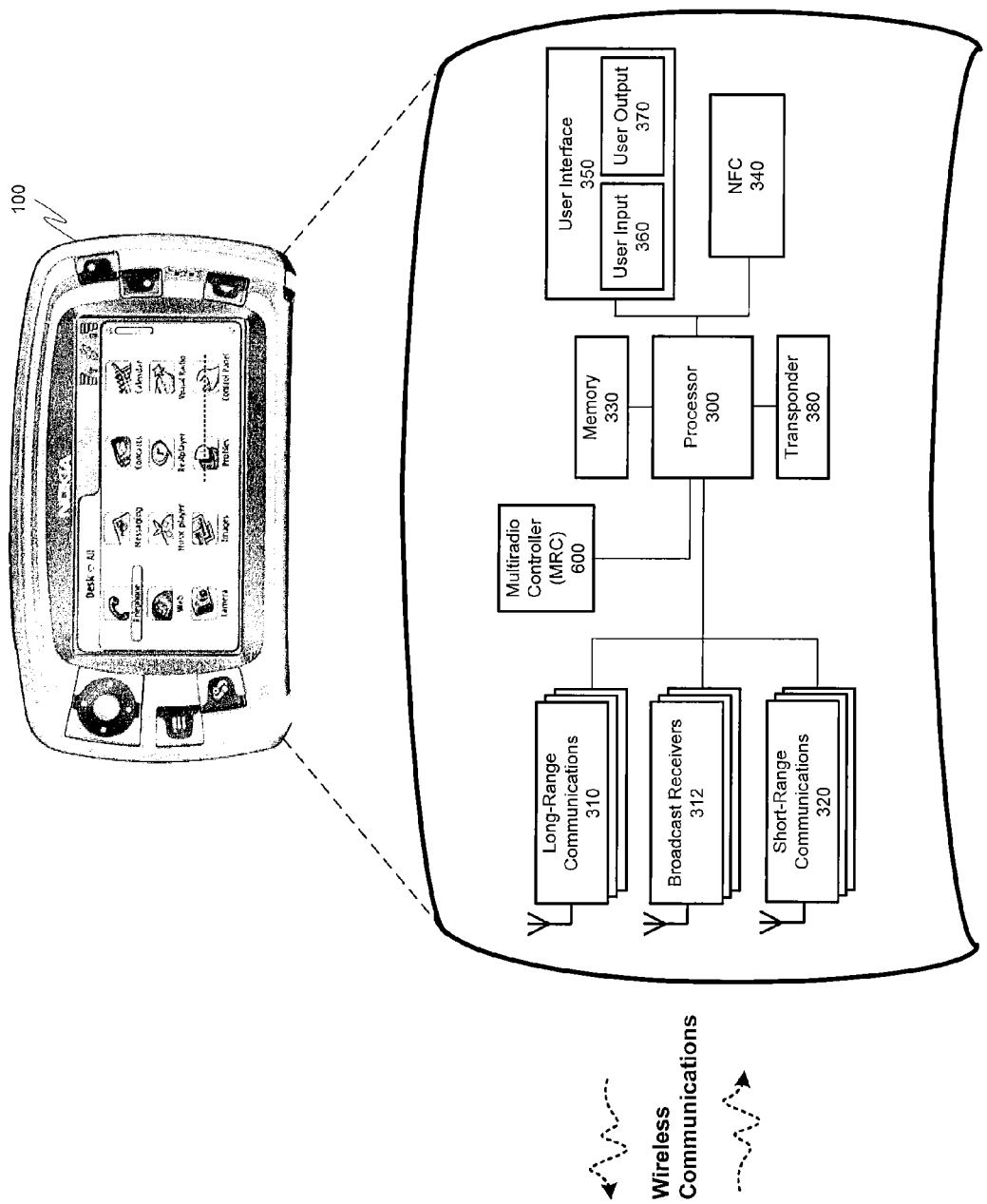
FIG. 6A discloses an exemplary structural description of a wireless communication device including a multiradio controller in accordance with at least one embodiment of the present invention.
Figure 6B:
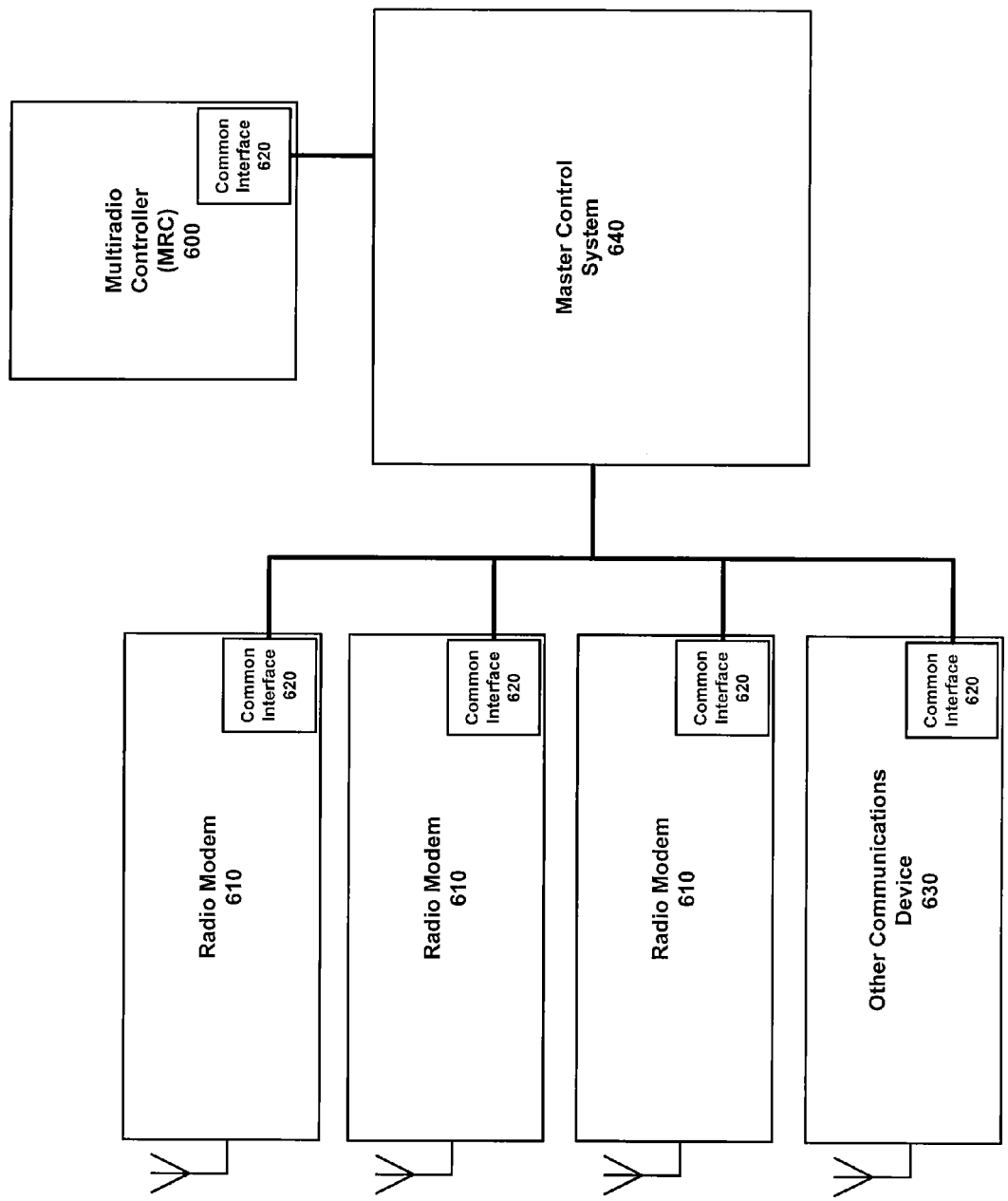
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Further, each radio modem 610 or similar communication device 630, for example an RFID scanner for scanning machine-readable information, may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

Figure 6C:
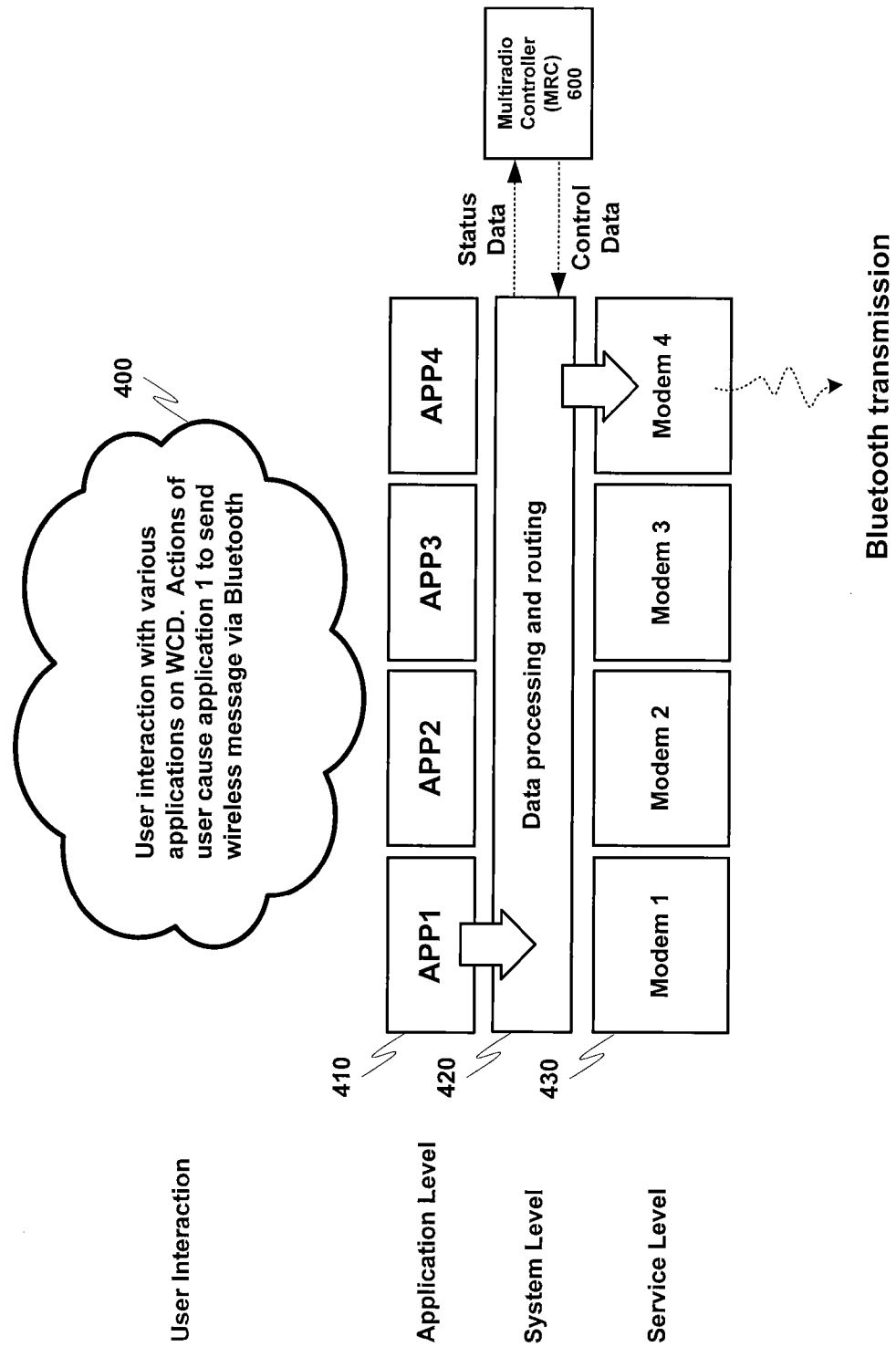
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

V. A Wireless Communication Device Including a Multiradio Control System.

Figure 7A:
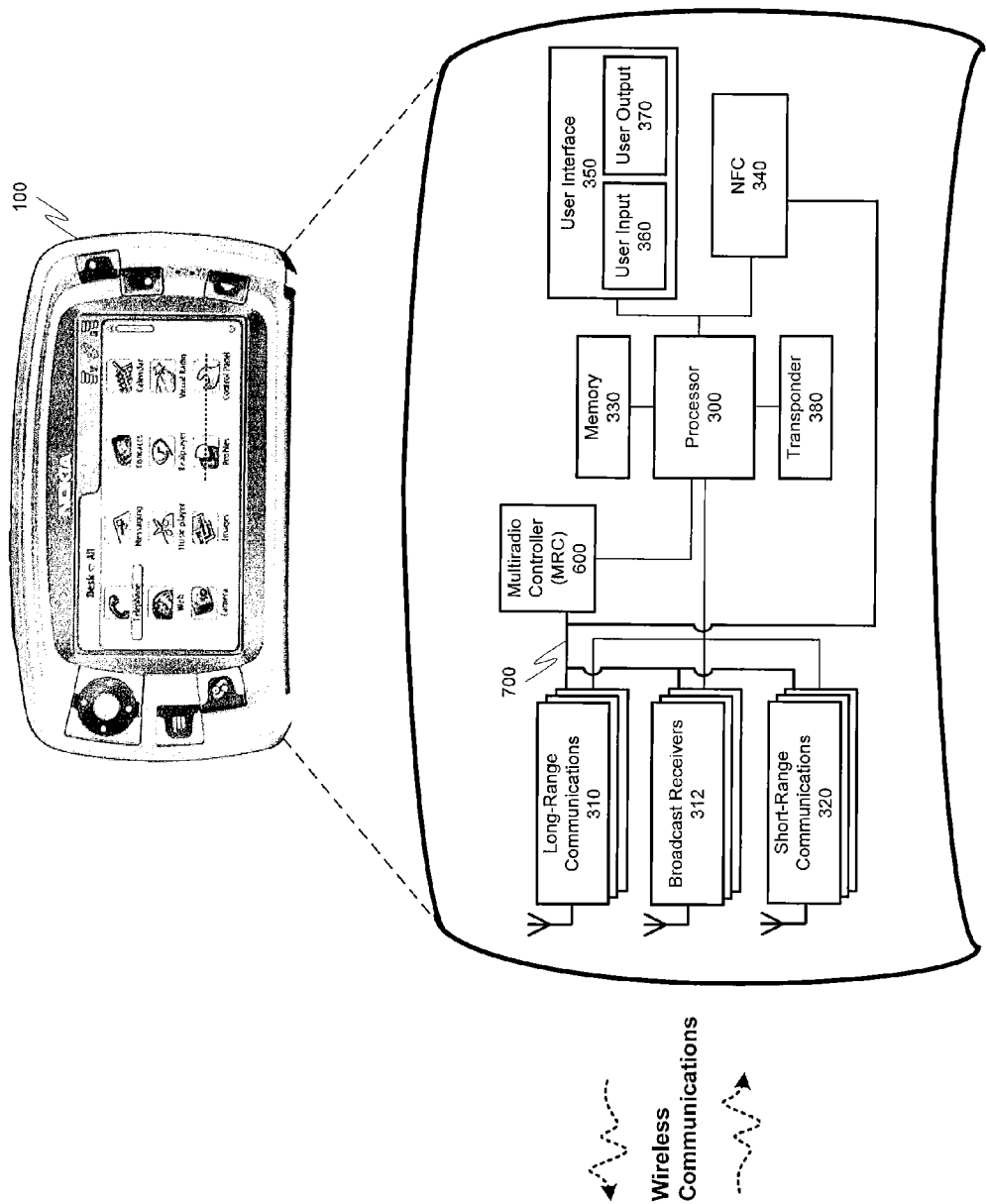
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communication resources of modules 310, 312, 320 and 340 to MRC 600. MCS 700 may provide a dedicated low-traffic communication structure for carrying delay sensitive information both to and from MRC 600.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

Figure 7C:
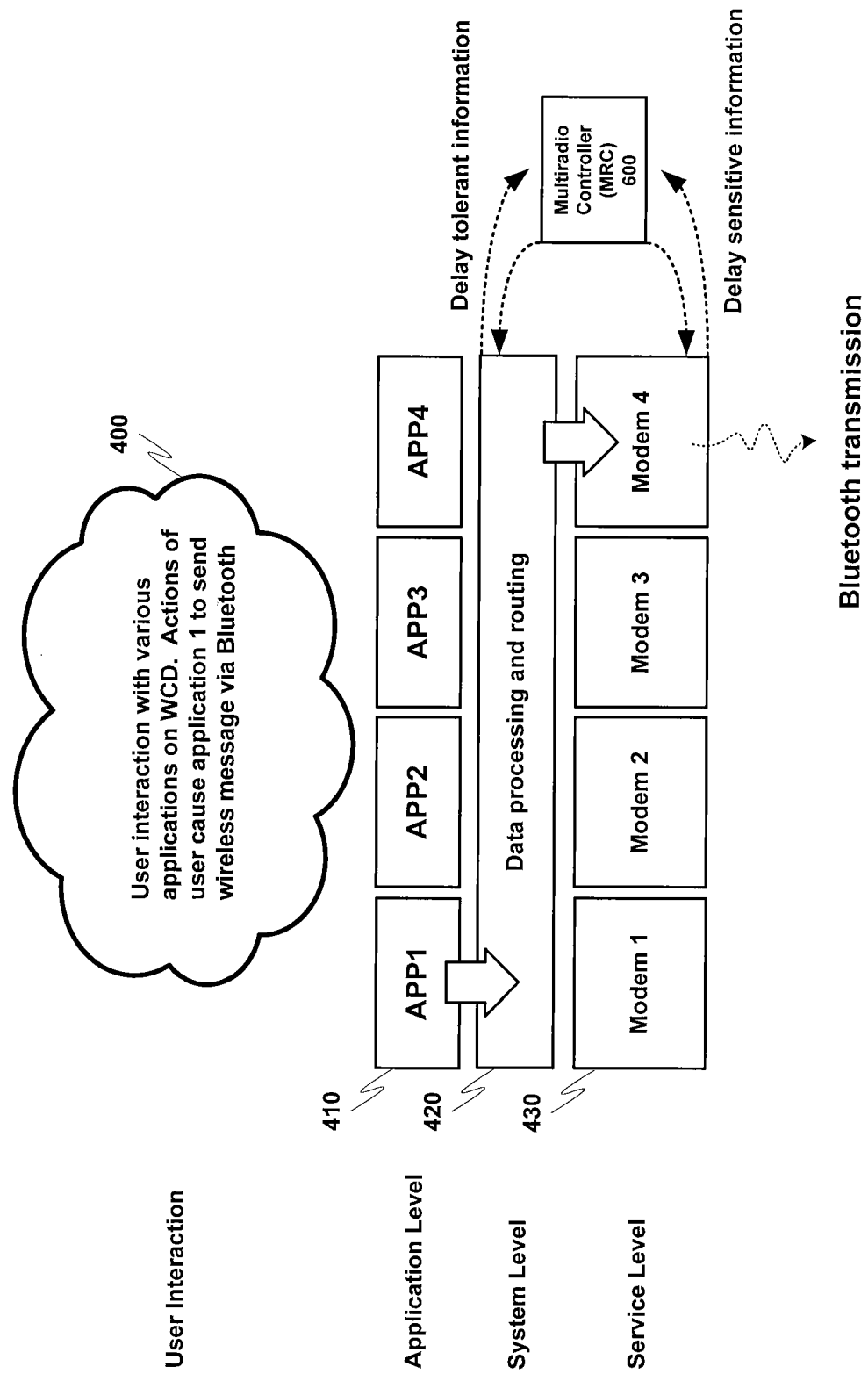
FIG. 7C discloses an exemplary operational description of a wireless communication device including a multiradio control system in accordance with at least one embodiment of the present invention.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to a request by MRC 600, or may be delivered as a result of a change in radio modem settings during transmission, as will be discussed with respect to synchronization below.

VI. A Wireless Communication Device Including a Distributed Multiradio Control System.

Figure 8A:
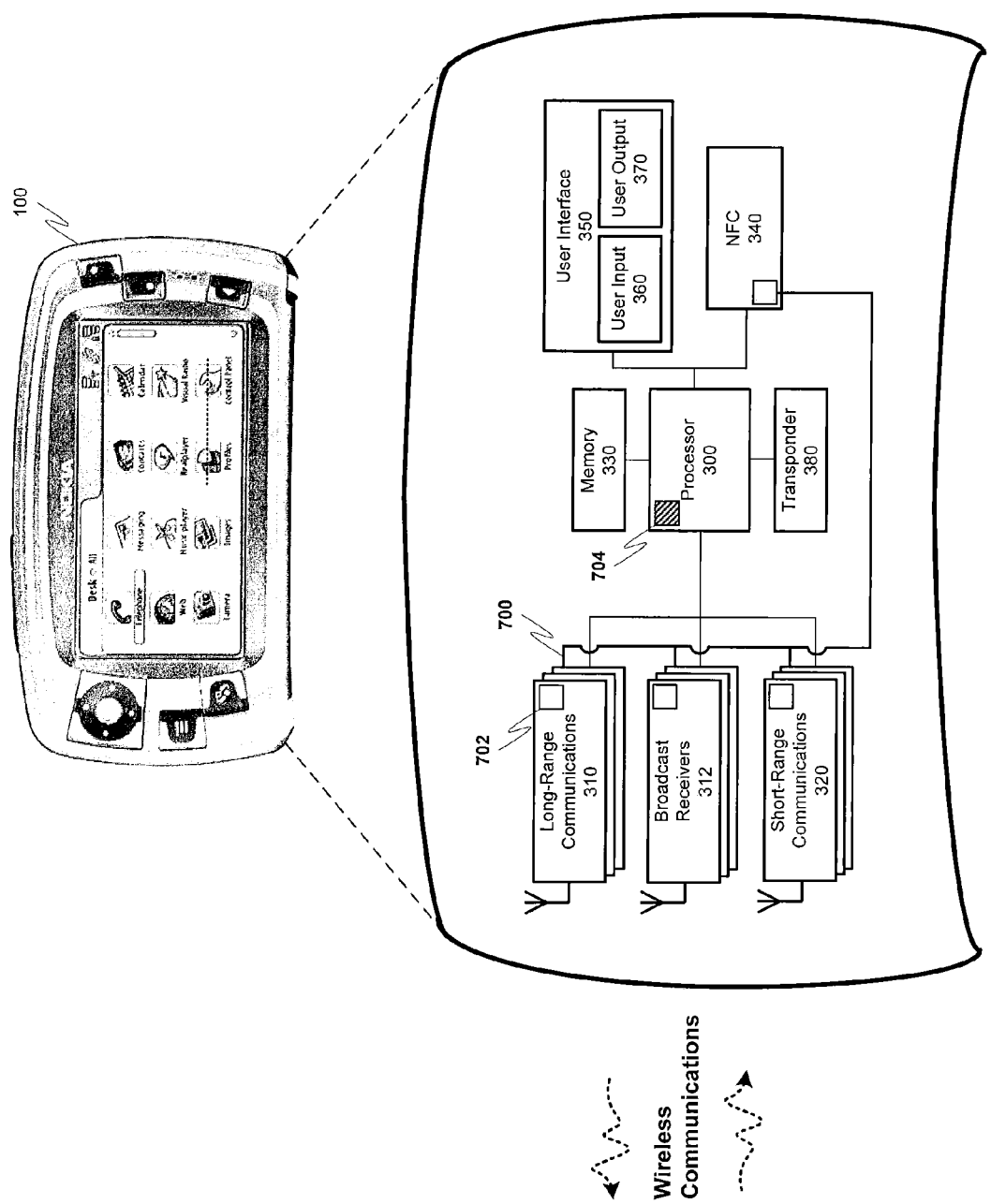
FIG. 8A discloses an exemplary structural description of a wireless communication device including a distributed multiradio control system in accordance with at least one embodiment of the present invention.

FIG. 8A discloses an alternative configuration in accordance with at least one embodiment of the present invention, wherein a distributed multiradio control system (MCS) 700 is introduced into WCD 100. Distributed MCS 700 may, in some cases, be deemed to provide an advantage over a centralized MRC 600 by distributing these control features into already necessary components within WCD 100. As a result, a substantial amount of the communication management operations may be localized to the various communication resources, such as radio modems 610, reducing the overall amount of control command traffic in WCD 100.

MCS 700, in this example, may be implemented utilizing a variety of bus structures, including the I²C interface commonly found in portable electronic devices, as well as emerging standards such as SLIMbus that are now under development. I²C is a multi-master bus, wherein multiple devices can be connected to the same bus and each one can act as a master through initiating a data transfer. An I²C bus contains at least two communication lines, an information line and a clock line. When a device has information to transmit, it assumes a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's I²C and I²S interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to this embodiment, and may reside in any appropriate system module within WCD 100. The addition of MCS 700 provides a dedicated low-traffic communication structure for carrying delay sensitive information both to and from the various distributed control components 702.

Figure 8B:
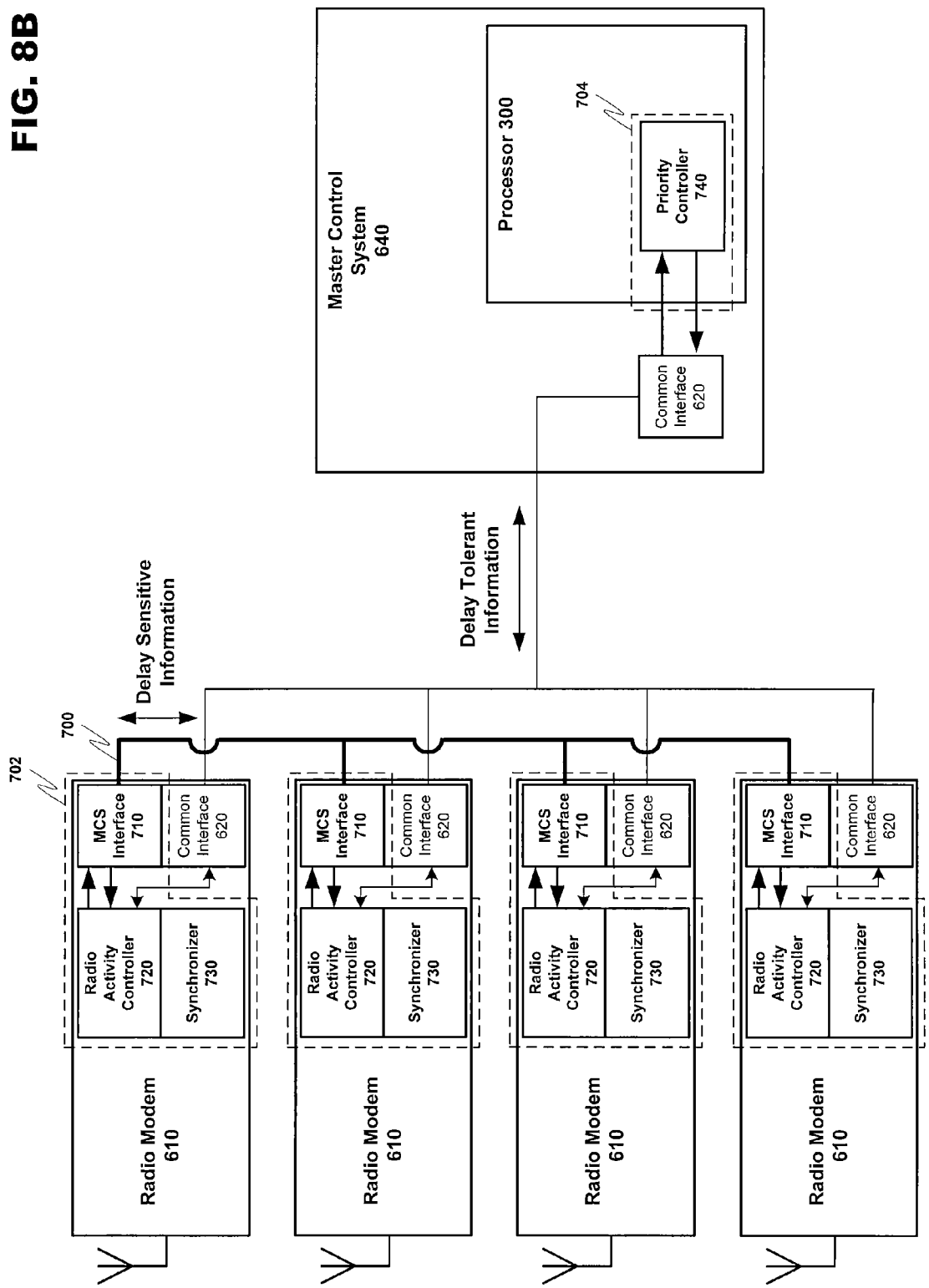
FIG. 8B discloses a more detailed structural diagram of FIG. 8A including the distributed multiradio control system and the radio modems.

The exemplary embodiment disclosed in FIG. 8A is described with more detail in FIG. 8B. MCS 700 forms a direct link between distributed control components 702 within WCD 100. Distributed control components 702 in radio modems 610 may, for example, consist of MCS interface 710, radio activity controller 720 and synchronizer 730. Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 702 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 activate/deactivate, and therefore, does not frequently change during the course of an active communication connection in radio modems 610. As a result, this information may be conveyed to radio modems 610 using common interface system 620 in at least one embodiment of the present invention.

Figure 8C:
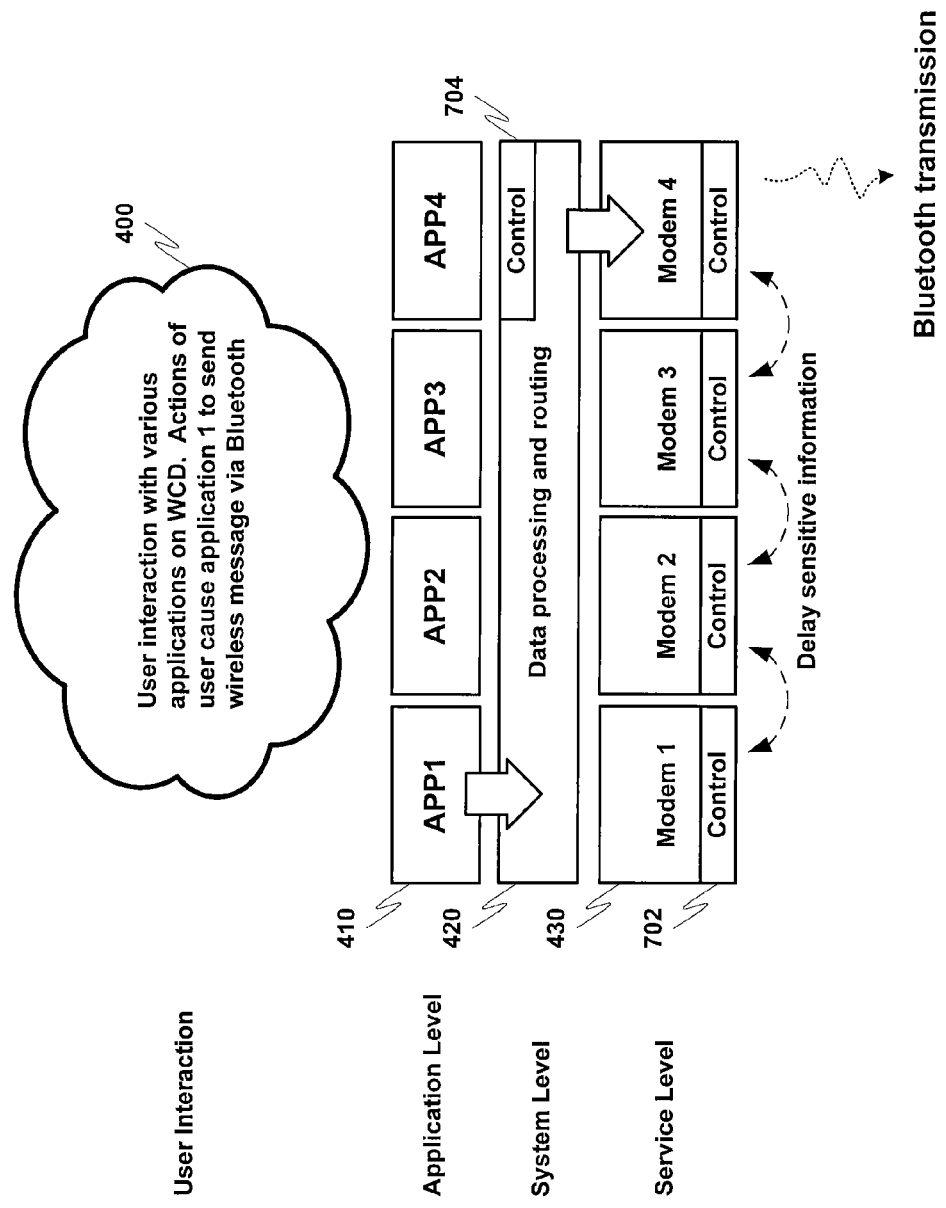
FIG. 8C discloses an exemplary operational description of a wireless communication device including a distributed multiradio control system in accordance with at least one embodiment of the present invention.

At least one effect of a distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information may include at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in BT (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

The radio modem activity control is based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 µs, followed by an empty slot after which is the reception slot of 577 µs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730.

When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

VII. A Wireless Communication Device Including an Alternative Example of a Distributed Multiradio Control System.

Figure 9A:
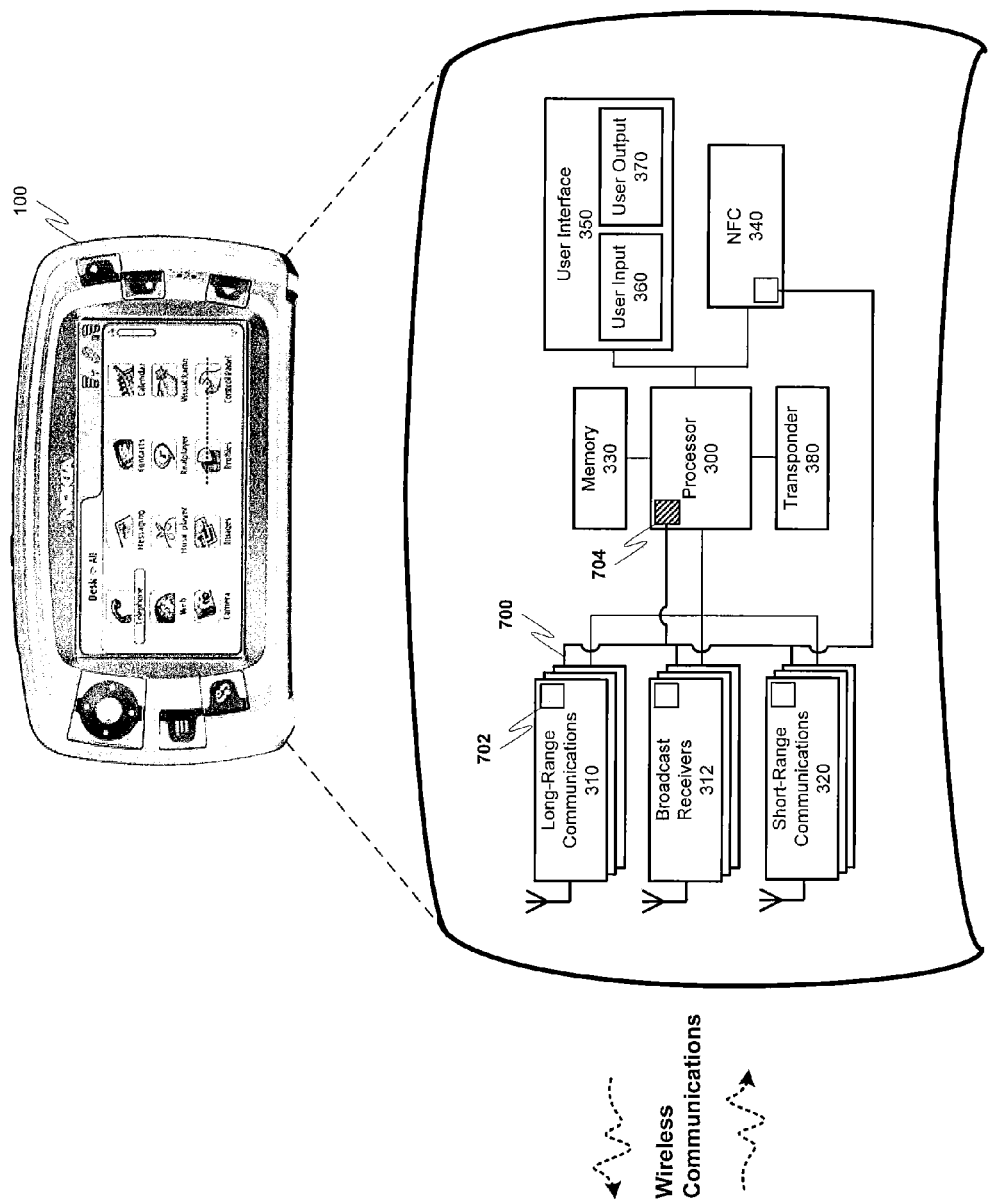
FIG. 9A discloses an exemplary structural description of a wireless communication device including a distributed multiradio control system in accordance with an alternative embodiment of the present invention.
Figure 9B:
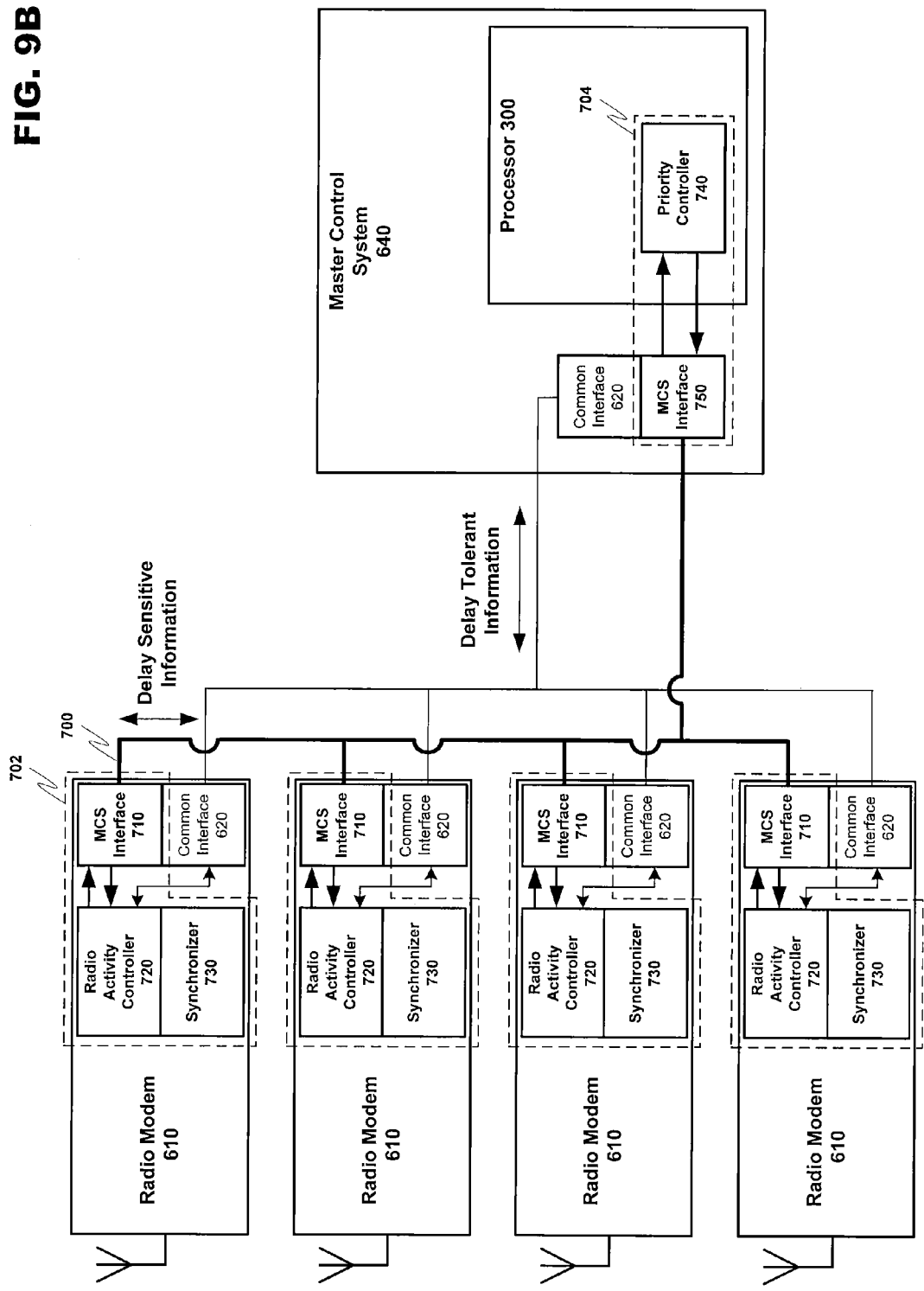
FIG. 9B discloses a more detailed structural diagram of FIG. 9A including the distributed multiradio control system and the radio modems.
Figure 9C:
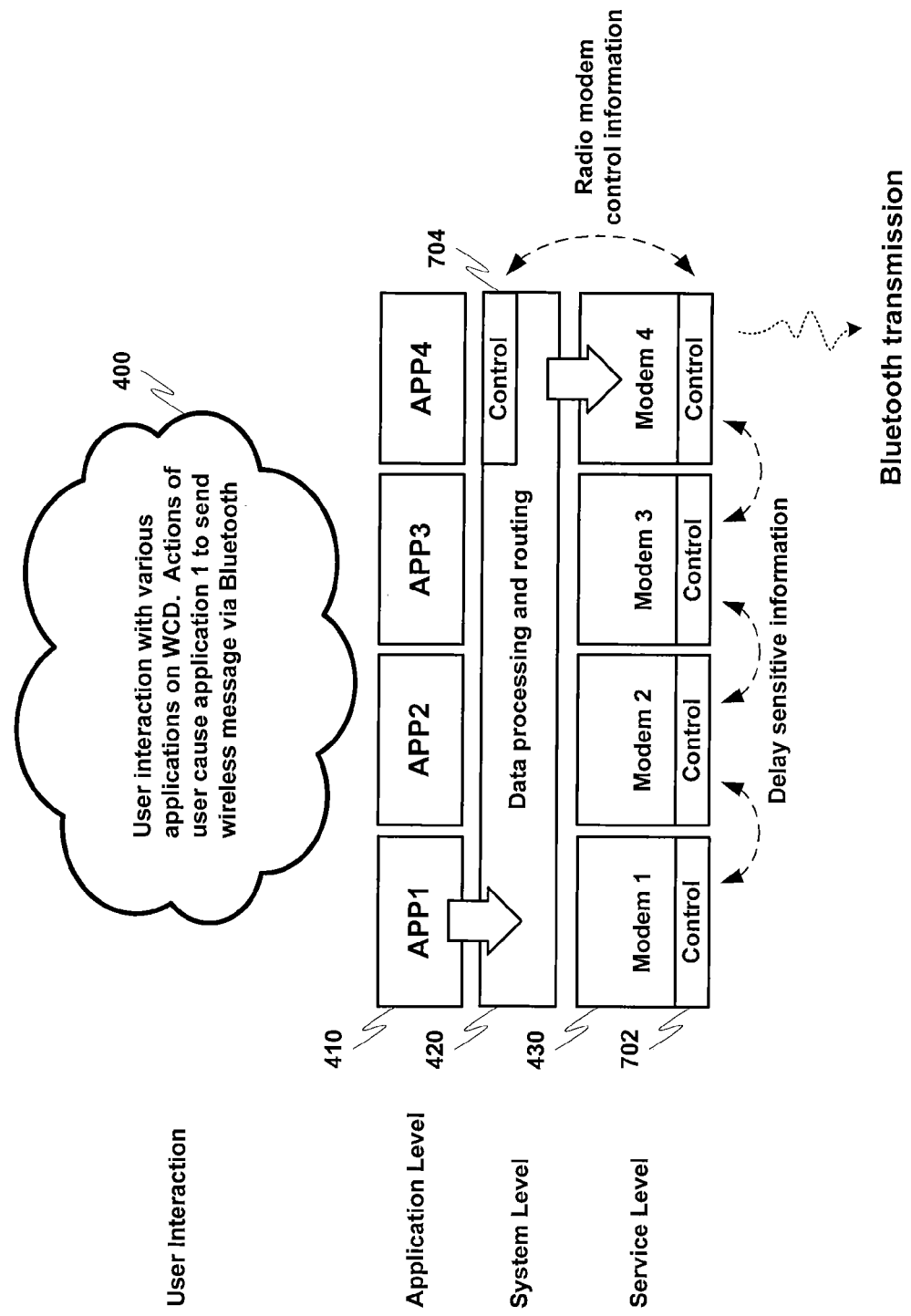
FIG. 9C discloses an exemplary operational description of a wireless communication device including a distributed multiradio control system in accordance with the alternative embodiment of the present invention disclosed in FIG. 9A.

An alternative distributed control configuration in accordance with at least one embodiment of the present invention is disclosed in FIG. 9A-9C. In FIG. 9A, distributed control components 702 continue to be linked by MCS 700. However, now distributed control component 704 is also directly coupled to distributed control components 702 via an MCS interface. As a result, distributed control component 704 may also utilize and benefit from MCS 700 for transactions involving the various communication components of WCD 100.

Referring now to FIG. 9B, the inclusion of distributed control component 704 onto MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communication between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

FIG. 9C discloses the operational effect of the enhancements seen in the current alternative embodiment of the present invention on communication in WCD 100. The addition of an alternative route for radio modem control information to flow between distributed control components 702 and 704 may both improve the communication management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

An example message packet 900 is disclosed in FIG. 10 in accordance with at least one embodiment of the present invention. Example message packet 900 includes activity pattern information that may be formulated by MRC 600 or radio activity controller 720. The data payload of packet 900 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed example of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600 or with radio activity controller 720 through synchronizer 730. The same happens if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more active wireless connections, the more accuracy is required in synchronization information.

VIII. Radio Modem Interface to Other Devices.

As a part of information acquisition services, the MCS interface 710 needs to send information to MRC 600 (or radio activity controllers 720) about periodic events of the radio modems 610. Using its MCS interface 710, the radio modem 610 may indicate a time instance of a periodic event related to its operation. In practice these instances are times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one embodiment of the present invention, the various messages exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

IX. Buffering Messages in Radio Modems.

FIG. 11A, two exemplary radio modems 610 are disclosed in more detail. As indicated in the figure, radio modems "A" and "B" are two examples of what may be many radio modems integrated within WCD 100. Radio modems 610 include, among other things, modem operations 1100 and modem buffer 1102. Modem operations 1100 may include, for example, radio activity controller 720 and synchronizer 730 in a WCD where a distributed control component configuration is utilized. Alternatively, it may constitute any control entity in WCD 100 (e.g., MRC 600) that issues control commands to radio modems 610. Modem buffer 1102 is a memory used to store outgoing transmissions, such as message packets, queued to be conveyed using the resources of radio modem 610. Modem buffer 1102 may be made up of any type of electronic memory used for temporarily storing information as well known in the art.

Modem operations 1100 and modem buffer 1102 may be coupled as shown in FIG. 11A. Modem operations 1100 may be coupled to both common interface 620 and MCS interface 710 in a bidirectional manner. This means that modem operations 1100 is enabled to transmit and receive information using one or both of these communication resources. Modem operations 1100 may further be coupled to an antenna in a bidirectional manner in order to transmit and receive information. The antenna pictured in FIG. 11A may include any hardware or software element typically considered part of the "physical layer" of radio modem 610 supporting the transmission or reception of wireless information. Further, in the example shown in FIG. 11A, modem buffer 1102 is typically coupled to common interface 620 so as to receive information from WCD 100 for transmission by radio modem 610. This information may be held in modem buffer 1102 until it is conveyed to modem operations 1100 for subsequent transmission over radio modem 610. Modem buffer 1102 may, in some instances, also receive wireless messages received by radio modem 610, or alternatively, a totally separate buffer may be employed to receive incoming messages. These two scenarios are not disclosed in FIG. 11A.

Figure 11B:
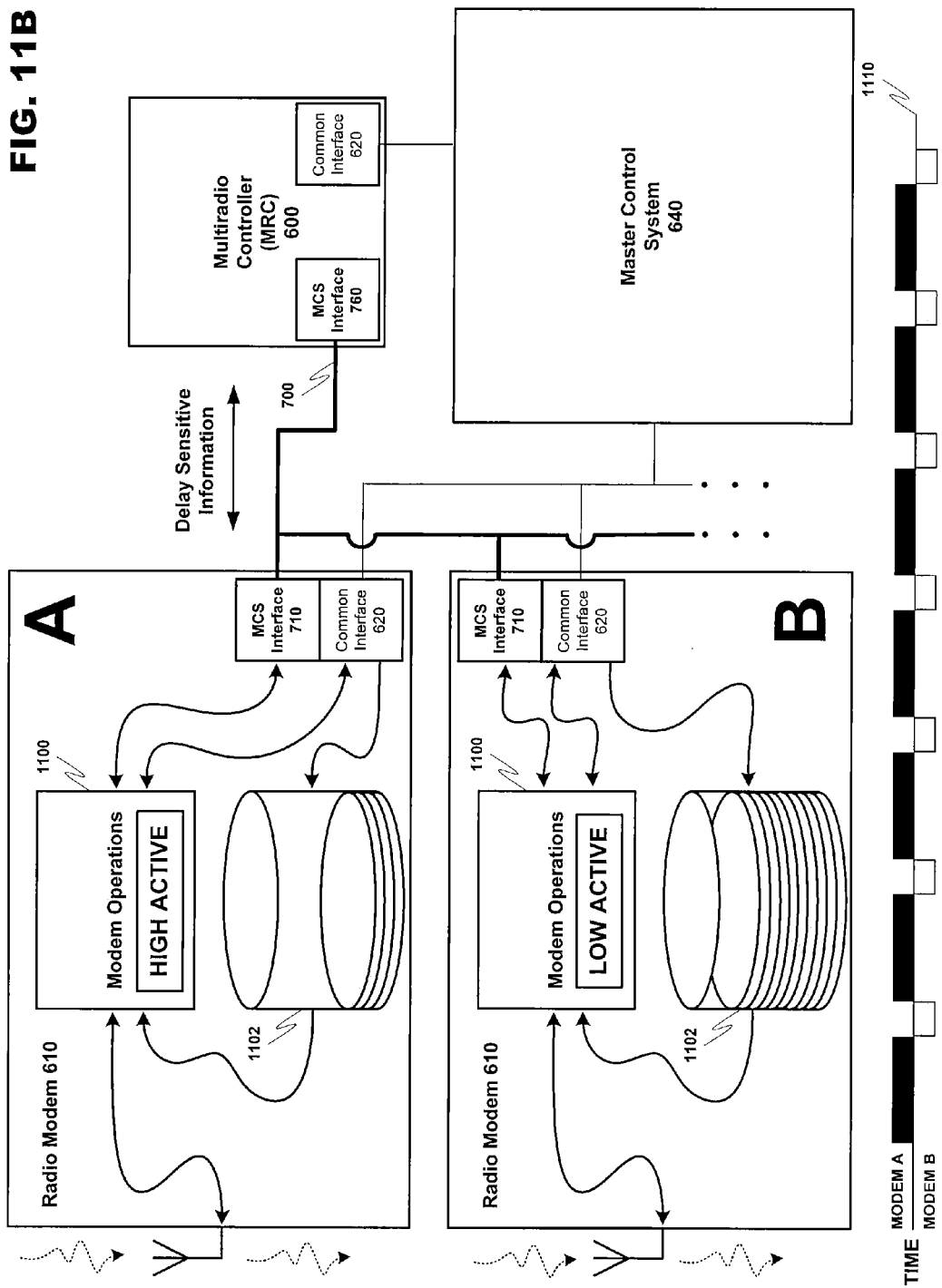
FIG. 11B discloses the exemplary radio modems of FIG. 11A in an scenario wherein communications may be occurring in accordance with at least one embodiment of the present invention.

FIG. 11B discloses the two exemplary radio modems 610 disclosed FIG. 11A now engaged in active wireless communication. In at least one embodiment of the present invention, radio modem 610 labeled as "A" (radio A) may have a higher assigned priority than radio modem 610 labeled as "B" (radio B). The higher priority assigned to radio A may be based on various characteristics of radio modem or wireless medium. For example, radio A may be used to communicate via Bluetooth™ communication, which may be a preferred wireless medium as compared to radio B which may communicate via WLAN. As a result, a large percentage of the available communication time may be reserved for radio A in an operational schedule computed, for example, by MRC 600. This situation is further indicated by the label "HIGH ACTIVE" for radio A and "LOW ACTIVE" for radio B. An example of a periodic operational schedule is shown in graph 1110, wherein most of the available transmission time is reserved for radio A, and radio B is forced to operate in the periods when radio A is not active.

A possible negative of the previously set forth radio modem management strategy on the message backlog in modem buffers 1102 is further shown in FIG. 11B. Since a large percentage of the available communication time is allocated to radio A (e.g., as shown by the black bars in graph 1110) the number of messages queued for transmission in radio A is low. However, the modem buffer 1102 in radio B has many more messages to transmit, and appears to be near full. This disparity may occur because very little communication time is allocated to radio B as compared to radio A. In a case where both wireless media may be used concurrently by applications on WCD 100, an overflow situation may occur in radio B resulting in diminished performance for the wireless medium, or the possible total failure in communication for radio B.

It is also important to note that factors, other than those pictured in FIG. 11B, may cause an increase in the buffered message queue of a particular radio modem, and as a result, a potential message queue overflow. For example, a program in application level 410 may utilize the hardware and software resources of radio modem 610 to send and receive messages. It is also foreseeable that these programs may unexpectedly request a large amount of wireless information be sent through a particular radio modem 610. The request to send the wireless information may be prompted, for example, by a user input on WCD 100. If the communication control resources of WCD 100 are not advised of this communication with enough time to redistribute resources accordingly then, regardless of the relative priority of the radio modem 610 with respect to other active radio modems, a potential communication overflow may occur.

X. Modem Buffer Monitoring and Alerting.

Figure 12A:
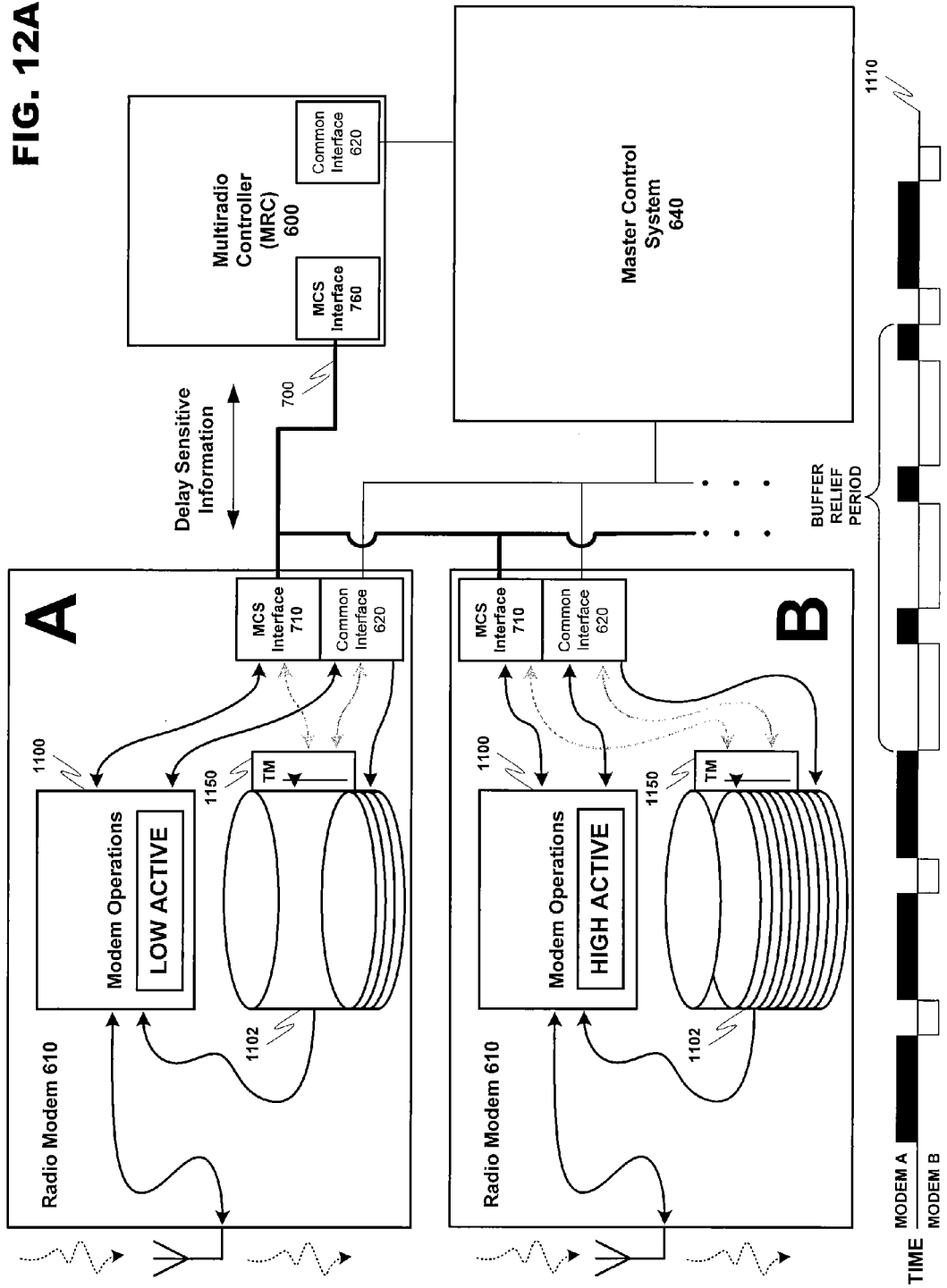
FIG. 12A discloses an example of the radio modems of FIG. 11A improved in accordance with at least one embodiment of the present invention.

FIG. 12A discloses the addition of a modem buffer monitoring system to WCD 100 in accordance with at least one embodiment of the present invention. Radio A and radio B now include threshold monitor (TM) 1150. TM 1150 may be employed as a separate device or structure incorporated into radio modem 610, or may be developed using existing hardware and/or software elements. For example, TM 1150 may be implemented as a new software module using existing hardware elements in radio modem 610. TM 1150 monitors the level of messages pending in modem buffer 1102, and may convey information related to the buffer level of modem buffer 1102 to various control elements in WCD 100 (e.g., MRC 600). It is beneficial to monitor the modem buffer 1102 of all active radio modems 610 since an overflow may potentially occur in any device, regardless of the relative priority of the active radio modems.

The monitoring of modem buffer 1102 by TM 1150 may be implemented in a variety of ways. TM 1150 may simply report out the amount of backlog in modem buffer 1102 to control elements in WCD 100. The backlog may be reported, for example, as a percentage of used space (or free space) in modem buffer 1102, the number of message packets waiting to be transmitted, an amount of raw data contained in modem buffer 1102, etc. Other information relevant to the backlog of messages may also be communicated, such as the age of the pending messages, a priority level for the messages to be sent (e.g., related to the issuing application), the type of message packets waiting to be sent, etc. Alternatively, TM 1150 may include intelligence which allows it to make a determination as to whether a threshold has been met. In such an implementation, TM 1150 may not transmit data to a controlling entity, but may instead just transmit a signal indicating that modem buffer 1102 is approaching an overflow condition.

In accordance with the functionality discussed with regard to TM 1150 above, the threshold condition may be defined based on one or more of the aforementioned statistics. For example, a threshold condition may be configured by any of the control elements in WCD 100, and may involve a predetermined percentage of used/free space in a message buffer, an amount of messages waiting to be transferred via a radio modem 610, an amount of accumulated raw data, and/or other statistics such as an age limit or priority level of pending messages, etc. A change of state of a modem buffer 1103 may also be used as a trigger (e.g., empty to half full).

When a threshold is met and/or exceeded, radio modems 610 may react in order to address the potential overflow problem indicated by the threshold. As further indicated in FIG. 12A, TM 1150 may be coupled to at least common interface 620, and also possibly to MCS interface 710. The coupling of TM 1150 may depend on how the overall multi-radio control strategy for WCD 100 is implemented. For example, if TM 1150 is simply delivering raw information to be evaluated by another control entity (e.g., MRC 600), then it may be sufficient to transmit this information via the master control system 640 of WCD 100. This information may then be sent at intervals from radio modem 610 to MRC 600, which interprets the data. These data transmissions to MRC 600 may also contain indications about time of the detected event. The data may reveal that a threshold condition has been met and/or exceeded, and therefore, MRC 600 may utilize MCS interface 760 and or common interface 620 in any of the scheduling methodologies previously set forth above in order to temporarily alter the operational schedule for one or more radio modems 610.

In another example of the present invention, TM 1150 may not transmit data at intervals regarding the buffer level to another control entity, but may instead include intelligence to determine when the threshold condition has been exceeded. In such an embodiment, TM 1150 may make the determination when the buffer threshold has been met and/or exceeded, and will transit a signal to another control entity in WCD 100 alerting as to a potential overflow situation. TM 1150 may advantageously be coupled to MCS 700 through MCS interface 710, which would allow it to transmit a delay-sensitive alert signal to MRC 600 indicating that action should be taken as a result of the detected threshold condition. MRC 600 may then utilize MCS interface 760 and or common interface 620, using any of the scheduling methodologies set forth above, in order to temporarily alter the operational schedule for one or more radio modems 610.

A potential modem buffer 1102 overflow may be alleviated, in at least one embodiment of the present invention, by reallocating communication time to the particular radio modem 610 experiencing the problem. In FIG. 12A, a similar timeline is shown in graph 1110 as was disclosed in FIG. 11B, however, a buffer relief period is now indicated, wherein additional time may be allocated to radio B to reduce the backlog of messages in modem buffer 1102. This reallocation of time may be implemented by MRC 600 or by a combination of various control elements in a distributed control solution. The reallocation may continue until the number of messages is again below a predetermined threshold, or alternatively, until a second threshold has been met and/or exceeded. The second threshold may be, for example, an extremely low backlog of messages in modem buffer 1102. Establishing an extremely low backlog of messages in a radio modem 610 may prevent constant switching between an operational schedule set by MRC 600 and a temporarily altered operational schedule put into effect in order to relieve a potentially problematic overflow of pending messages in one or more radio modems 610.

Figure 12B:
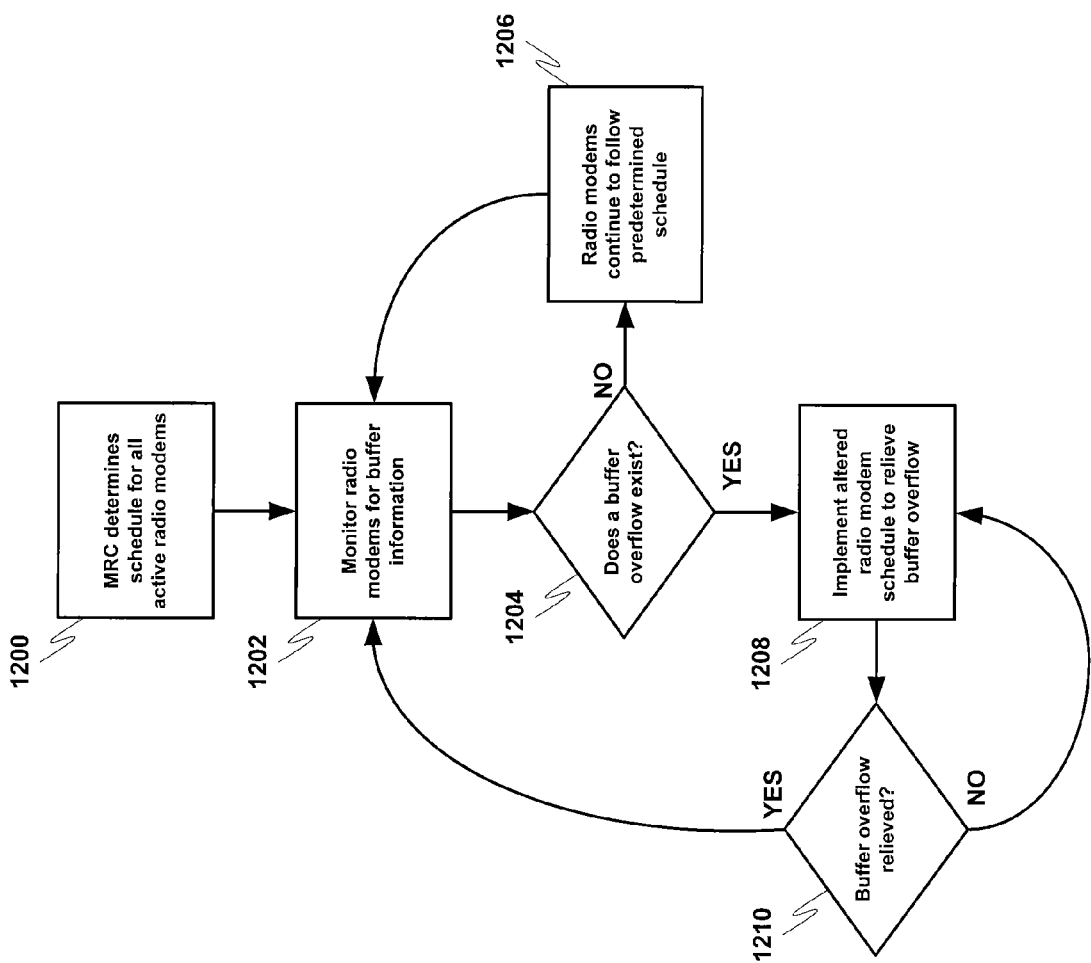
FIG. 12B discloses a flowchart explaining an exemplary process by which communications in lower priority radio modems may be managed in accordance with at least one embodiment of an instant invention.

FIG. 12B discloses an exemplary process for managing buffer overflow problems in accordance with at least one embodiment of the present invention. In step 1200, MRC 600 determines a schedule for all active radio modems 610. This schedule, as described above, may balance the operation of various radio modems 610 so as to allow for concurrent multiradio communication while avoiding conflicts between the various active radio modems 610. The modem buffers 1102 of all radio modems 610 may also be monitored in step 1202 in order to determine whether a predetermined buffer overflow condition has been met and/or exceeded. If the monitoring of the modem buffers 1102 in step 1204 determines that no potential buffer overflow exists (step 1206), then monitoring may continue in step 1204 until a potential buffer overflow is detected.

If a buffer overflow exists in determination step 1204, then in step 1208 MRC 600, or another multiradio control entity, may temporarily implement an altered operational schedule for one or more active radio modems 610. The altered operational schedule may divert communication time reserved for some radio modems 610 (e.g., higher priority modems 610) to the other radio modems 610 (e.g., lower priority radio modems 610) that may be experiencing a potentially problematic buffer overflow. This reallocation of time may continue until the backlog of messages in modem buffer 1102 of the one or more lower priority radio modems 610 is reduced, or until another threshold level has been met and/or exceeded. If the buffer overflow is relieved, as determined in step 1210, then modem buffer monitoring may continue in step 1202. Otherwise the altered operational schedule is maintained in step 1208.

The present invention includes at least a strategy for managing a plurality of radio modems utilizing possibly conflicting wireless communication mediums in the same wireless communication device in order to avoid potential communication difficulties. This beneficial behavior may be further enhanced by monitoring active radio modems in order to determine if a modem buffer is nearing a potentially problematic overflow of messages waiting for transmission. In this way, these radio modems may be temporarily allowed more time for transmission than normally would be allocated in order to alleviate the potential buffer overflow.

Accordingly, it will be apparent to persons skilled in the relevant art that various changes in form a and detail can be made therein without departing from the spirit and scope of the invention. This the breadth and scope of the present invention should not be limited by any of the above-described exemplary embodiments, but should be defined only in accordance with the following claims and their equivalents.

What is claimed:

1. A method, comprising:
   defining an operational schedule for two or more radio modems in a device, wherein defining the operational schedule includes assigning periods of time during which each of the two or more radio modems is permitted to operate;
   receiving buffer level information from each of the two or more radio modems;
   determining if a predetermined buffer threshold level has been exceeded in any of the two or more radio modems based on the received buffer level information; and
   temporarily reassigning periods of time that were previously assigned to radio modems determined to have buffer levels at or below their respective predetermined buffer threshold level to radio modems determined to have buffer levels exceeding their respective predetermined buffer threshold level until the exceeding buffer levels drop below their respective predetermined threshold level.

2. The method of claim 1, wherein defining an operational schedule for two or more radio modems includes allocating communication time to each of the radio modems.

3. The method of claim 1, wherein each of the two or more radio modems communicates using a wireless communication medium.

4. The method of claim 3, wherein at least one of each radio modem or each wireless medium is prioritized.

5. The method of claim 4, wherein a transmission time is allocated to each radio modem based on its priority.

6. The method of claim 1, wherein the buffer level information includes information about the amount of data in transmission buffer for each radio modem.

7. The method of claim 6, wherein the threshold condition related to the buffer level includes at least one of a percentage of buffer usage, a number of messages in the buffer, and a change of state of the buffer.

8. The method of claim 1, wherein adjusting the operational schedule for the two or more radio modems includes temporarily altering the existing operational schedule.

9. The method of claim 8, wherein temporarily altering the existing operational schedule includes reallocating communication time from at least one radio modem to at least one other radio modem.

10. The method of claim 8, wherein the operational schedule is restored when the threshold condition related to the buffer level is no longer met.

11. A device, comprising:
   at least one processor; and
   at least one memory including executable instructions, the at least one memory and the executable instructions being configured to, in cooperation with the at least one processor, cause the device to perform at least the following:
      define an operational schedule for two or more radio modems in the device, wherein defining the operational schedule includes assigning periods of time during which each of the two or more radio modems is permitted to operate;
      receive buffer level information from each of the two or more radio modems
      determining if a predetermined buffer threshold level has been exceeded in any of the two or more radio modems based on the received buffer level information; and
      temporarily reassign periods of time that were previously assigned to radio modems determined to have buffer levels at or below their respective predetermined buffer threshold level to radio modems determined to have buffer levels exceeding their respective predetermined buffer threshold level until the exceeding buffer levels drop below their respective predetermined threshold level.

12. The device of claim 11, wherein the two or more radio modems are integrated within the wireless communication device.

13. The device of claim 11, wherein the each of the two or more radio modems includes a threshold monitor to monitor the buffer level.

14. The device of claim 13, wherein the threshold monitor periodically sends buffer level information to the multiradio controller via a common interface.

15. The device of claim 13, wherein the threshold monitor periodically sends buffer level information to the multiradio controller via a dedicated interface utilized to convey delay-sensitive information.

16. The device of claim 13, wherein the threshold monitor sends a signal to the multiradio controller when the threshold condition related to the buffer level has been met.

17. The device of claim 16, wherein the signal is sent to the multiradio controller via a dedicated interface utilized to convey delay-sensitive information.

18. The device of claim 11, wherein adjusting the operational schedule for the two or more radio modems includes temporarily altering the existing operational schedule.

19. The device of claim 18, wherein temporarily altering the existing operational schedule includes reallocating communication time from at least one radio modem to at least one other radio modem.

20. The device of claim 18, wherein the operational schedule is restored when the threshold condition related to the buffer level is no longer met.

21. A computer program product comprising a computer executable program code recorded on a non-transitory computer usable medium, the computer executable program code comprising:
   code configured to define an operational schedule for two or more radio modems in a device, wherein defining the operational schedule includes assigning periods of time during which each of the two or more radio modems is permitted to operate;
   code configured to receive buffer level information from each of the two or more radio modems;
   determining if a predetermined buffer threshold level has been exceeded in any of the two or more radio modems based on the received buffer level information; and
   code configured to temporarily reassign periods of time that were previously assigned to radio modems determined to have buffer levels at or below their respective predetermined buffer threshold level to radio modems determined to have buffer levels exceeding their respective predetermined buffer threshold level until the exceeding buffer levels drop below their respective predetermined threshold level.

22. The computer program product of claim 21, wherein defining an operational schedule for two or more radio modems includes allocating communication time to each of the radio modems.

23. The computer program product of claim 21, wherein each of the two or more radio modems communicates using a wireless communication medium.

24. The computer program product of claim 23, wherein at least one of each radio modem or each wireless medium is prioritized.

25. The computer program product of claim 24, wherein a transmission time is allocated to each radio modem based on its priority.

26. The computer program product of claim 21, wherein the buffer level information includes information about the amount of data in transmission buffer for each radio modem.

27. The computer program product of claim 26, wherein the threshold condition related to the buffer level includes at least one of a percentage of buffer usage, a number of messages in the buffer, and a change of state of the buffer.

28. The computer program product of claim 21, wherein adjusting the operational schedule for the two or more radio modems includes temporarily altering the existing operational schedule.

29. The computer program product of claim 28, wherein temporarily altering the existing operational schedule includes reallocating communication time from at least one radio modem to at least one other radio modem.

30. The computer program product of claim 28, wherein the operational schedule is restored when the threshold condition related to the buffer level is no longer met.

31. A multiradio controller, comprising:
   at least one communication interface coupled to a common interface;
   at least one communication interface coupled to a interface dedicated to conveying delay sensitive information; and
   a control module configured to:
      define an operational schedule for two or more radio modems in a device, wherein defining the operational schedule includes assigning periods of time during which each of the two or more radio modems is permitted to operate;

receive buffer level information from each of the two or more radio modems determining if a predetermined buffer threshold level has been exceeded in any of the two or more radio modems based on the received buffer level information; and temporarily reassign periods of time that were previously assigned to radio modems determined to have buffer levels at or below their respective predetermined buffer threshold level to radio modems determined to have buffer levels exceeding their respective predetermined buffer threshold level until the exceeding buffer levels drop below their respective predetermined threshold level.

32. The controller of claim 31, wherein adjusting the operational schedule for the two or more radio modems includes temporarily altering the existing operational schedule.

33. The controller of claim 32, wherein temporarily altering the existing operational schedule includes reallocating communication time from at least one radio modem to at least one other radio modem.

34. The controller of claim 32, wherein the operational schedule is restored when the threshold condition related to the buffer level is no longer met.

* * * * *